United States Patent [19]
Ensley et al.

[11] Patent Number: 5,917,117
[45] Date of Patent: Jun. 29, 1999

[54] INDUCING HYPERACCUMULATION OF METALS IN PLANT SHOOTS

[75] Inventors: Burt D. Ensley, Newtown, Pa.; Michael J. Blaylock, Daytoin, N.J.; Slavik Dushenkov, East Brunswick, N.J.; Nanda P.B.A. Kumar, New Brunswick, N.J.; Yoram Kapulnik, Ness Ziona, Israel

[73] Assignee: Phytotech, Inc., Monmouth Junction, N.J.

[21] Appl. No.: 08/621,138

[22] Filed: Mar. 21, 1996

[51] Int. Cl.⁶ ........................................ C22B 3/24
[52] U.S. Cl. ............................ 75/711; 75/712; 210/602
[58] Field of Search ........................ 75/710, 711, 712; 210/602

[56] References Cited

U.S. PATENT DOCUMENTS

| | | | |
|---|---|---|---|
| 3,728,254 | 4/1973 | Carothers | 210/7 |
| 4,293,333 | 10/1981 | Drobot | 75/101 BE |
| 4,293,334 | 10/1981 | Drobot et al. | 75/101 BE |
| 4,310,990 | 1/1982 | Payne | 47/59 |
| 4,333,837 | 6/1982 | Plosz et al. | 210/602 |
| 4,678,582 | 7/1987 | LaVigne | 210/150 |
| 4,732,681 | 3/1988 | Galun et al. | 210/611 |
| 4,839,051 | 6/1989 | Higa | 210/602 |
| 4,872,985 | 10/1989 | Dinges | 210/602 |

(List continued on next page.)

FOREIGN PATENT DOCUMENTS

| | | |
|---|---|---|
| 3406004 | 8/1985 | Germany . |
| 277905 | 4/1990 | Germany . |
| 3921336 | 1/1991 | Germany . |
| 4100758 | 7/1992 | Germany . |
| 4319992 | 12/1994 | Germany . |
| 57-000190 | 1/1982 | Japan . |
| 161297 | 7/1986 | Japan . |
| 64-7997 | 1/1989 | Japan . |
| 916438 | 4/1982 | U.S.S.R. . |
| 1346588 | 10/1987 | U.S.S.R. . |
| 1411295 | 7/1988 | U.S.S.R. . |
| WO 9401367 | 1/1994 | WIPO . |
| WO 9429226 | 12/1994 | WIPO . |
| WO 9429466 | 12/1994 | WIPO . |

OTHER PUBLICATIONS

Baker et al., "The potential for heavy metal decontamination", *Min. Env. Man.*, pp. 12–14, Sep. 1995.

Baker et al., "The potential for the use of metal–accumulating plants for the in situ decontamination of metal–polluted soils", *Proc. EUROSOL Conf., Eur. Conf. on Integrated Res. Soil Sed. Protect. Remed.*, MECC Maastricht, the Netherlands, Sep. 1992.

Baker et al., "In situ decontamination of heavy metal polluted soils using crops of metal–accumulating plants—a feasibility study", *In situ Bioreclamation*, Butterworth—Heinemann, Stonham, MA, pp. 600–605, 1991. [Month unavailable and not in issue].

(List continued on next page.)

*Primary Examiner*—Melvyn Andrews
*Attorney, Agent, or Firm*—Brenda Herschbach Jarrell; Choate, Hall & Stewart

[57] ABSTRACT

The present invention provides methods by which hyperaccumulation of metals in plant shoots is induced by exposure to inducing agents. Hyperaccumulation occurs as part of a two-step process in which metals are first accumulated into plant roots; subsequent transport to plant shoots is induced by exposure to the agent. In preferred embodiments, manipulations that increase availability of metals to the plant are employed prior to application of the inducing agent. Effective inducing agents include conditions of low pH, chelators, herbicides, and high levels of heavy metals. Other phytotoxic agents are also useful. Application of multiple inducing agents results in synergistic effects.

57 Claims, 7 Drawing Sheets

U.S. PATENT DOCUMENTS

| | | | |
|---|---|---|---|
| 4,904,386 | 2/1990 | Kickuth | 210/602 |
| 4,959,084 | 9/1990 | Wolverton et al. | 55/68 |
| 4,992,207 | 2/1991 | Darnall et al. | 252/315.6 |
| 4,995,969 | 2/1991 | La Vigne | 210/150 |
| 5,000,852 | 3/1991 | Tel-Or et al. | 210/602 |
| 5,099,049 | 3/1992 | Chamberlain | 556/148 |
| 5,100,455 | 3/1992 | Pinckard et al. | 71/9 |
| 5,106,504 | 4/1992 | Murray | 210/602 |
| 5,120,441 | 6/1992 | Jackson et al. | 210/602 |
| 5,121,708 | 6/1992 | Nuttle | 119/3 |
| 5,129,936 | 7/1992 | Wilson | 71/63 |
| 5,156,741 | 10/1992 | Morrison et al. | 210/602 |
| 5,221,327 | 6/1993 | Rusin | 75/712 |
| 5,269,094 | 12/1993 | Wolverton et al. | 47/62 |
| 5,292,456 | 3/1994 | Francis et al. | 252/628 |
| 5,320,663 | 6/1994 | Cunningham | 75/432 |
| 5,337,516 | 8/1994 | Hondulas | 47/65 |
| 5,364,451 | 11/1994 | Raskin et al. | 75/710 |
| 5,393,426 | 2/1995 | Raskin et al. | 210/602 |
| 5,422,268 | 6/1995 | Rusin | 435/262 |
| 5,436,384 | 7/1995 | Grant et al. | 588/1 |
| 5,458,747 | 10/1995 | Marks et al. | 204/130 |

OTHER PUBLICATIONS

Baker et al, "Terrestrial higher plants which hyperaccumulate metallic elements—a review of their distribution, ecology, and phytochemistry", *Biorecovery,* 1:81–126, 1989. [Month unavailable and not in issue].

Bender et al., "Lead removal from contaminated water by a mixed microbial ecosystem", *Wat. Sci. Tech.* 21:1661–1664, 1989. [Month unavailable and not in issue].

Berti et al., "Remediating soil Pb with green plants", presented at the Intl. Conf. of the Soc. for Env. Geochem. and Health, New Orleans, LA, Jul. 25–27, 1993 (pub'd Sep. 1993.

Bishop, "Pollution fighters hope a humble weed will help reclaim contaminated soil", *Wall St. J.,* Feb. 29, 1996.

Boon et al., "Lead, cadmium, and zinc contamination of aspen garden soils and vegetation", *Fert. Soils Plants Nutr.,* 116:775, 1992. [Month unavailable and not in issue].

Cataldo et al., "Cadmium distribution and chemical fate in soybean plants", *Plant Physiol.* 68:835–839, 1981. [Month unavailable and not in issue].

Chaney et al., "Potential use of metal hyperaccumulators", *Mining Env. Management,* pp. 9–11, Sep. 1995.

Chatterjee, *Oilseed brassicas in Indian agriculture,* Vikas Publishing House, Chapter 6 ("Agronomy"), pp. 139–159, 1991. [Month unavailable and not in issue].

Checkai et al., "Effects of ionic and complexed metal concentrations on plant uptake of cadmium and micronutrient metals from solution", *Plant and Soil,* 99:335–345, 1987. [Month unavailable and not in issue].

Chigbo et al., "Uptake of arsenic, cadmium, lead and mercury from polluted waters by the water hyacinth *eichhornia crassipes*", *Environ. Poll. A* 27:31–36, 1982. [Month unavailable and not in issue].

Conley et al., "An assessment of the root zone method of wastewater treatment", *J. Water. Poll. Control. Fed.* 63:239–247, May, 1991.

Crowley, "Mechanisms of iron acquisition from siderophores by microorganisms and plants", *Plant and Soil,* 130:179–198, 1991. [Month unavailable and not in issue].

Dierberg et al., "Removal of copper and lead using a thin–film technique", *Aquatic Plants for Water Treatment and Resource Recovery,* Magnolia Publishing (eds. Reddy and Smith), pp. 407–504, 1987. [Month unavailable and not in issue].

Doushenkov, "Phytoremediation potential of crop plants", *Supp. to Plant. Physiol.* 105:43, May, 1994 (Abstracts of papers from Ann. Mtg. of Am. Soc. Plant Physiol., Portland, OR, Jul. 30–Aug. 3, 1994).

Doushenkov, "Rhizofiltration: the use of plants to remove heavy metals from aqueous streams", *Environ. Sci. Technol.,* 29(5):1239–1245, May, 1995.

Elad et al., "Possible role of competition for nutrients in biocontrol of pythium damping–off by bacteria", *Ecol. and Epidemiol.,* 77(2):190–195, 1987. [Month unavailable and not in issue].

Evans et al., "Expression of the pea metallothionein–like gene $PsMT_A$ in *Escherichia coli* and *Arabidopsis thaliana* and analysis of trace metal ion accumulation: implications for $PsMT_A$ function", *Plant. Mol. Biol.,* 20:1019–1028, 1992. [Month unavailable and not in issue].

Haider et al., "Pollution control by water hyacinth", Proc. of the Int'l Conf. on Water Hyacinth, Hyderabad, India, Feb. 7–11, 1983 (pub. 1984), pp. 627–634.

Halvorson et al., "The critical $Zn^{2+}$ concentration for corn and nonabsorption of chelated zinc", *Soil Soc. A.M. J.,* 41:531–534, 1977. [Month unavailable and not in issue].

Heaton et al., "Lead uptake by the water hyacinth", *Aquatic plants for water treatment and resource recovery,* Magnolia Publishing (eds. Reddy and Smith), pp. 471–485, 1987. [Month unavailable and not in issue].

Heaton et al., "Lead uptake by *Eichhornia crassipes*", *Toxicol. Env. Chem.* 11:125–135, 1986. [Month unavailable and not in issue].

Heubert et al., "The effect of EDTA on cadmium and zinc uptake and toxicity in *Lemna trisulca* L", *Arch. Environ. Contam. Toxicol.,* 22:313–318, 1992. [Month unavailable and not in issue].

Jamil et al., "Biotransfer of metals to the insect *Neochetina eichhornae* via aquatic plants", *Arch. Evir. Contam. Toxicol.* 22:459–463, 1992. [Month unavailable and not in issue].

Jewell, "Resource–recovery wastewater treatment", *Am. Scientist.* 82:366–375, Jul. 1994.

Jorgensen, "Removal of heavy metals from compost and soil by ecotechnological methods", *Ecological Engineering,* 2:89–100, 1993. [Month unavailable and not in issue].

Kay et al., "Effects of heavy metals on water hyacinths (*Eichhornia crassipes* (Mart.) Solms)", *Aquatic Toxicol.,* 5:117–128, 1984. [Month unavailable and not in issue].

Keefer et al., "Chemical composition of vegetables grown on an agricultural soil amended with sewage sludges", *Biol. Abstr.,* 82:9330, 1986. [Month unavailable and not in issue].

Kumar et al., "Phytoextraction: the use of plants to remove heavy metals from soils", *Environ. Sci. Technol.,* 29(5):1232–1238, May 1995.

Lee et al., "Copper untake by the water hyacinth", *J. Environ. Sci. Health,* A22(2):141–160, 1987. [Month unavailable and not in issue].

"Dupont takes team approach to using plants for remediation", *The Bioremediation report,* p. 4, Jan., 1995.

McGrath et al., "The potential for the use of metal–accumulating plants for the in situ decontamination of metal–polluted soils", *Soil Environ.,* pp. 673–676, 1993. [Month unavailable and not in issue].

Misra et al., "Heavy metal tolerant transgenic *Brassica napus* and *Nicotiana tabacum* L. plants", *Theor. Appl. Genet.,* 78:161–168, 1989. [Month unavailable and not in issue].

Muramoto et al., "Removal of some heavy metals from polluted water by the water hyacinth (*Eichhornia crassipes*)", *Bull Envir. Contam. Toxicol.* 30:170–177, 1983. [Month unavailable and not in issue].

Okieimen et al., "Removal of heavy ions from aqueous solution with melon (*Citrullus vulgaris*) seed husks", *Biological Wastes,* 29:11–16, 1989. [Month unavailable and not in issue].

Ordentich et al., "Rhizosphere Colonization by *Serratia morcescers* for the control of *Sclerotium rolfsii*", *Soil Biol. Biochem.,* 19(6):747–751, 1987. [Month unavailable and not in issue].

Raskin et al., "Bioconcentration of heavy metals by plants", *Curr. Op. Biotech.* 5:285–290, 1994. [Month unavailable and not in issue].

Raymer et al., *Canola and Rapeseed,* Chapter 3, "Agronomy of canola in the United States", (Shahidi, ed.), Van Nostrand Rheinhold, pp. 25–25, 1990. [Month unavailable and not in issue].

Reeves et al., "Abnormal accumulation of trace metals by plants", *Mining Env. Management,* pp. 4–7, Sep. 1995.

Salt et al., "Phytoremediation: a new technology for the environmental cleanup of toxic metals", presented at the 33rd Ann. Conf. of Metallurgists: Advances in Material Production, Performance, and Stewardship, Toronto, Ont., Aug. 20–25, 1994.

Salt et al., "Phytoremediation: a novel strategy for the removal of toxic metals from the environment using plants", *Bio/Technology,* 13:468, May, 1995.

Stomp et al., "Genetic strategies for enhancing phytoremediation", presented at Recomb. DNA Tech. II. Conf., Palm Coast FL, Jan. 31–Feb. 3, 1993, pub *Ann. NY Acad. Sci.,* 721:481–492 (Bajpaj, et al., eds.), 1994.

Sunda et al., "Feedback interactions between zinc and phytoplankton in seawater", *Limnol. Oceanog.,* 37(1):25–40, 1992. [Month unavailable and not in issue].

Sunda et al., "The relationship between cupric ion activity and the toxicity of copper to phytoplankton", *J. Marine Res.,* 34(4):511–529, 1976. [Month unavailable and not in issue].

Taiz et al., *Plant Physiology,* "Essential Elements", pp. 107–108, 1991. [Month unavailable and not in issue].

Thomas et al., *Canola growers manual,* Chapters 6–9, Published by the Canola Council of Canada, 1984. [Month unavailable and not in issue].

Turnquist, "Nickel uptake by the water hyacinth", *J. Environ. Sci. Health,* A25:897–912, 1990. [Month unavailable and not in issue].

Wills et al., "Absorption of $^{59}$Fe by water hyacinths", *Aquatic Plants for Water Treatment and Resource Recovery,* Magnolia Publishing (eds. Reddy and Smith), pp. 471–485, 1987. [Month unavailable and not in issue].

Wolverton, "Aquatic plants for wastewater treatment: an overview", *Aqu. Plants Treat. Res. Recov.,* Magnolia Publishing (eds. Reddy and Smith), pp. 3–15, 1987. [Month unavailable and not in issue].

Yusuf et al., "Effects of several production factors on two varieties of rapeseed in the central United States", *J. Plant Nutr.,* 16(7):1279–1288, 1993. [Month unavailable and not in issue].

Rauser, "Phytochelatins and related peptides", *Plant Physiol.,* 109:1141–1149, Dec. 1995.

INDUCING HYPERACCUMULATION OF METALS IN PLANT SHOOTS

BACKGROUND OF THE INVENTION

Activities in the Industrial Age have resulted in the deposit of high levels of many metals in certain sites, to the point that human life is seriously threatened. Metal-production activities, such as mining or smelting, as well as the ubiquitous use of metals, have created many sites where toxic metals have become concentrated in soils. Although the problem has been recognized for many years, and much effort has been expended on methods to remove the metals, existing techniques are cumbersome, expensive, and invasive.

In recent years, efforts have been made to utilize metal-accumulating plants to remove contaminating metals from sites (see, for example, Baker et al. *New Scientist* 1603:44, 1989; Chaney et al. *in Land Treatment of Hazardous Wastes* ed. by Parr et al., Noyes Data Corp: Park Ridge, pp 50–76, 1983). There are many advantages to using plants for remediation, including lower costs, generation of recyclable metal-rich plant residue, applicability to a range of toxic metals and radionuclides, minimal environmental disturbance, elimination of secondary air or water-borne wastes, and public acceptance.

Unfortunately, most of the known metal-accumulating plants are slow-growing, small and/or weedy plants that produce low biomass (see, for example, Baker et al. supra), so that even if the plants concentrate metals effectively, they cannot remove large amounts of metal from the soil. Furthermore, most plants that accumulate metals collect the metal in their roots rather than into their above-ground shoot portions. In fact, it is generally accepted that most plants do not accumulate significant levels of heavy metals into their shoots. Since metal accumulated into plant roots cannot be removed from the site until the plant roots themselves are harvested, standard phytoremediation protocols require that the roots be harvested, an expensive and complicated process.

There remains a profound need for improved methods of remediating metal-contaminated sites.

SUMMARY OF THE INVENTION

The present invention provides a method for inducing plants to hyperaccumulate metals into their shoots. The invention therefore provides a novel and highly advantageous method for phytoremediation of metal-contaminated sites, as plant shoots can readily be harvested and removed from the site. The present invention concentrates metals in a readily disposable biomass to levels higher than the concentration of metal in the soil and thereby greatly reduces the weight of contaminated material that must be disposed. An additional benefit of the present invention, as compared with other available techniques, is that the soil is cleaned rather than removed, and therefore remains available for use by the owner.

In preferred embodiments of the present invention, a plant is cultivated in a metal contaminated environment, the environment is manipulated so that availability of the metal in the environment to the plant is increased, the plant is allowed to take metal up into its roots, and the plant is then exposed to an inducing agent under conditions and for a time sufficient for the plant to hyperaccumulate metal in its shoots. Preferred plants for use in the present invention include members of the family Brassicaceae, and particularly those of the genus Brassica. Preferred inducing agents include chelating agents, soil acidifiers, herbicides, and high concentrations of heavy metals.

The present invention therefore provides an improved method for removing metal from an environment by cultivating a plant therein, in which the improvement comprises exposing the plant to an inducing agent under conditions and for a time sufficient for the plant to hyperaccumulate metal into its shoots to a levels higher than it would if it were not exposed to the inducing agent.

The invention also provides a method for identifying agents that act to induce hyperaccumulation of metal to plant shoots. According to the present invention, a plant is grown in a metal-contaminated environment, is exposed to a potential inducing agent, such as a chemical or physical stress, and is analyzed to determine the level of metal it accumulated into its shoots. Desirable inducing agents according to the present invention are those that stimulate a plant to accumulate more metal after exposure to the agent than it does without such exposure. Preferably, the plant is induced to accumulate at least twice as much metal in its shoots after exposure to the agent than it does without such exposure.

DETAILED DESCRIPTION OF PREFERRED EMBODIMENTS OF THE INVENTION

Figure 1A:
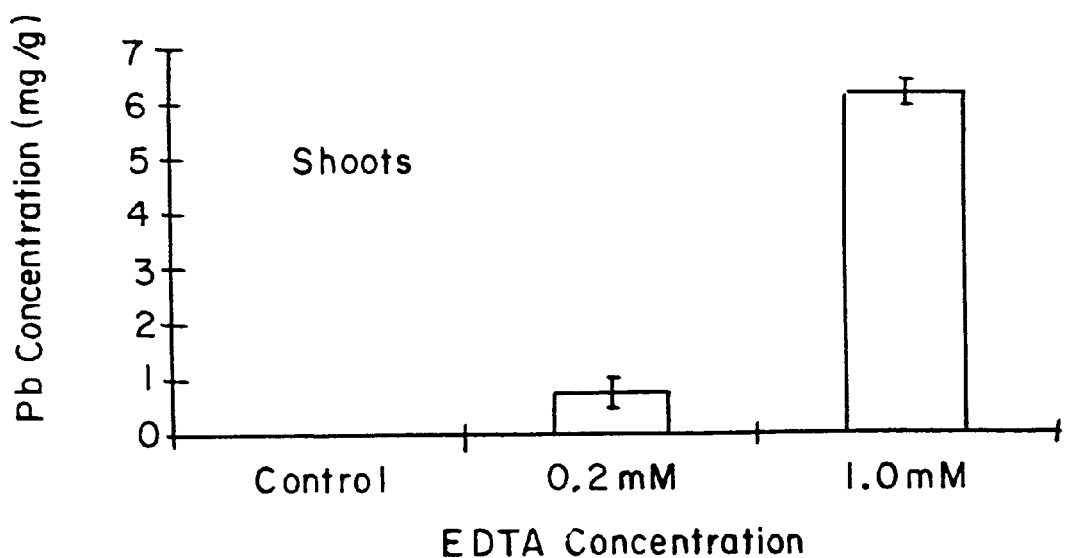
FIG. 1 is a bar graph showing the effects of EDTA on lead accumulation in roots and shoots of a *Brassica juncea* cultivar.

Metal hyperaccumulation according to the present invention occurs by a two-step process in which plants accumulate metals into their roots and are then induced by application of an "inducing agent" to transfer high levels of root-accumulated metals to their shoots. As noted above, the prior art teaches that plants do not typically transport significant levels of metals into their shoots (see, for example, Cunningham et al. *Bioremediation of Inorganics*, Battelle Press, Columbus-Richland, 1995, p. 33–54). The present invention provides novel methods for increasing metal transport into plant shoots.

The present invention identifies a variety of useful inducing agents that stimulate hyperaccumulation of metals in plant shoots. Generally, the present invention teaches that phytotoxic substances are useful inducing agents. Without wishing to be bound by any particular theory, we propose that phytotoxic substances induce metal hyperaccumulation by disrupting the plant metabolism in a way that overrides natural safety mechanisms that would otherwise operate to block transport of metal into shoots. We note, however, that our theory does not suggest that the induction of metal transport described herein is exclusive of continued uptake of metal into plant roots. That is, metal uptake into plant roots probably continues, and may even be enhanced, during the induction period. We focus on the transport aspect primarily because it is clear that induction of hyperaccumulation according to the present invention results in accumulation of significantly higher levels of metal in plant shoots than would be observed in the absence of such induction. Thus, whatever effects the inducing stimulus may (or may not) have on metal uptake into plant roots, transport into shoots is clearly enhanced.

Consistent with our model, we note that healthy plants, not exposed to inducing agents, typically do not accumulate significant levels of metals into their shoots. Also, metal accumulation into plant shoots has dramatic negative effects on plant growth. In the present invention, the negative effect on plant growth can be largely or almost totally avoided by delaying the application of the inducing agent until the plants have accumulated a desirable amount of biomass. Then, because once the stimulus is applied, transport of metal into shoots is quite rapid, the metal-containing shoots can be harvested without delay.

Thus, according to the present invention, selected plants are cultivated in an environment, typically soil, that is contaminated with metal. After a period of plant growth, plants are induced by exposure to one or more inducing agents to hyperaccumulate metals into their shoots. An "inducing agent", according to the present invention, is any treatment that, when applied to a plant or the soil, induces the plant to accumulate more metal in its shoots than it would accumulate in the absence of the treatment. Preferably, the plant is induced to accumulate at least about twice as much metal in its shoots as it would in the absence of the treatment.

For the purposes of the present invention, a plant is considered to have "hyperaccumulated" a metal in its shoots when, in response to an inducing agent, it has i) achieved a metal concentration in its shoots ($\mu$g metal/g dry weight shoot mass) that is higher than the concentration of metal in the soil (mg/kg soil or mg/L solution); and/or ii) accumulated at least about 1000 $\mu$g of metal per gram dry weight of shoot mass. Preferably, the plant has achieved a metal concentration that is at least about two-fold higher than the concentration in the soil, and/or has accumulated at least about 3000 $\mu$g of metal per gram dry weight of shoot mass.

The absolute amount of metal accumulated according to the present invention depends on the type of metal being accumulated. For example, lead has proven to be a particularly difficult metal for plants to transport into their shoots (see, for example, Cunningham et al. *Bioremediation of Inorganics,* Battelle Press, Columbus-Richland, 1995, p. 33–54). According to the present invention, lead is preferably accumulated to at least about 3000 $\mu$g/g d.w. shoot mass, more preferably to at least about 4000 $\mu$g/g d.w. shoot mass, and most preferably to at least about 6000 $\mu$g/g d.w. shoot mass (see Examples).

Hyperaccumulation according to the present invention is enhanced by procedures that increase the availability of metals in the soil (e.g., by increasing metal solubility) to plants cultivated therein. Increases in metal availability result in increased levels of metal accumulation to plant roots, which in turn results in increased levels of metal transport to plant shoots. Hyperaccumulation according to the invention is also enhanced by procedures that reduce metal precipitation at and/or within the plant roots, as such precipitation limits the supply of metals available for transport into shoots. Accordingly, preferred embodiments of the present invention involve manipulations that increase metal availability in soil and/or that inhibit metal precipitation. In fact, some of the inducing agents specifically discussed herein, notably acids and metal complexing agents ("chelators"), act both as inducing agents and as promoters of metal solubility in the soil and/or within the plant.

The present invention also demonstrates that combinations of inducing agents, applied simultaneously or with intervening time periods, often have synergistic effects on metal accumulation. In preferred embodiments of the invention, plants are exposed to a first manipulation that increases metal availability (e.g., by employing a first inducing agent that itself increases metal availability and/or by taking additional steps to enhance availability, as is discussed below), and then to a second manipulation comprising application of an inducing agent that stimulates metal transport to the shoots. For example, we have found the application of low pH and/or a chelating agent as a first inducing agent, followed by a delay period and application of herbicide as a second inducing agent, results in very high levels of metal hyperaccumulation. It is particularly preferred that plants be cultivated to high biomass prior to exposure to the first or second manipulations, in order that a large volume of plant tissue is available for metal accumulation. It may also be desirable, however, for accumulation to be induced prior to termination of plant growth.

In the following sections, we present more thorough discussions of particular aspects of, and considerations relevant to, the present invention.

Plants

Plant members that can be used in accordance with the present invention include any plant that is capable of being induced to hyperaccumulate heavy metals by the methods described herein. Specifically, any plant that can be induced to hyperaccumulate into its shoots a metal to a concentration greater than the corresponding concentration of metal in the growth media (soil) to be treated is useful in the practice of the invention.

Of course, not all plants can be induced to accumulate high levels of heavy metals in their shoots according to the present invention. In fact, even within a given plant species, not all cultivars will show the desired hyperaccumulation activity. However, one of ordinary skill in the art will readily be able to identify inducible plants by following the procedures set forth herein, in combination with known screening strategies (see, for example, Kumar et al., *Environmental Science and Technology* Vol. 29, No. 5, 1995). Any plant that, when cultivated in a metal-contaminated soil and exposed to an inducing agent as described herein, hyperaccumulates metal in its shoots to a greater extent than it would in the absence of the inducing agent is desirable. Preferably, the plant is capable of accumulating metal in its shoots to a concentration above that of the metal in the soil in response to the inducing agent.

Preferred plant members for use in the present invention, in addition to being capable of hyperaccumulating metal in their shoots to a concentration higher than that in the soil, have one or more of the following characteristics:

(a) An ability to produce several crops per year. Plants that can produce several crops per year can remove greater quantities of metal from a given contaminated site because the volume of biomass produced over a growing season with such a plant is greater than that for a single crop. Because the amount of metal removed depends on the mathematical product of two factors— (1) the unit uptake of metal per unit of shoot weight (i.e, the concentration), and (2) the amount of harvestable biomass with said metal concentration—plants that produce more harvestable biomass are more likely to remove larger amounts of metal from the site.

(b) An ability to adapt for growth in various climates and soil conditions. Use of adaptable plants takes advantage of the total know-how obtained with a given plant species insofar as its agricultural and metal accumulation response is concerned. Thus, a particularly useful species about which much is known becomes even more useful and valuable insofar as its effectiveness applies in varying climatic and soil conditions;

(c) An ability to adapt to modified conventional agricultural practices. Plants that respond to conventional agricultural practices are preferred for the present invention inasmuch as they can be easily cultivated and stimulated to produce vigorous root and shoot growth under intensive agricultural practices (i.e., mechanical tillage, irrigation, fertilization, high plant populations). Particularly preferred are plants that can be adapted for use on contaminated soils that require extremely intensive agricultural practices to produce vigorous growth in the face of soil conditions, such as shallowness, high gravel content, poor drainage, high salinity, or severe compaction, that are normally adverse to good growth;

(d) An amenability to genetic manipulation by mutagenesis and/or gene transfer. Plants amenable to genetic manipulation may be used to provide material for genetic transformations to incorporate into other plants one or more characteristics desired for the practice of the present invention. Alternatively, plants amenable to genetic manipulation may act as receptors of genetic transformations to develop or improve desired characteristics, thereby becoming useful (or more useful) in the present invention.

(e) An ability to grow to high biomass. Other characteristics being equal, plants that produce large amounts of biomass remove more metal from the soil in a given crop. It will be immediately recognized by those skilled in the art that selection solely by the criterion of volume of biomass produced is inappropriate because the other factor affecting the amount of metal removed in a crop—namely, the metal concentration in harvested shoots—will, like biomass production, vary from plant to plant. Further, we have found in some of our experimentation that prolonging the time interval before application of a given stimulus to, for example, applying the stimulus after the plant begins to senesce, may indeed result in greater biomass generation, but at the expense of a decrease in the amount of metal which can be concentrated into plant shoots.

Among the plants that are preferred for use in accordance with the present invention are those designated herein as "crop members". "Crop members" are those plants that are grown primarily as either vegetative sources (e.g. as vegetables, forage, fodder, and/or condiments), or oilseeds. Crop members are preferred in the practice of the present invention primarily because they tend to produce large amounts of biomass.

Also preferred are "crop-related" members, which herein are defined as those plants that have potential value as a crop and/or as donors of agronomically useful genes to crop members. Thus, crop-related members are able to exchange genetic material with crop members, thereby permitting breeders and biotechnologists to perform interspecific (i.e., from one species to another) and intergeneric (i.e., from one genus to another) gene transfer, according to known techniques (see, for example, Goodman et al. *Science* 236:48, 1987, incorporated herein by reference).

Particularly preferred plants for use in the practice of the present invention are members of the Brassicaceae family, preferably crop and/or crop-related members. Preferred members of the Brassicaceae family include, but are not limited to plants of the genera Brassica, Sinapis, Thlaspi, Alyssum, and Eruca. Particularly preferred are Brassica species *B. juncea, B. nigra, B. campestris, B. carinata, B. napus, B. oleracea*, and cultivars thereof. An especially useful *B. juncea* cultivar is number 426308 (see Examples).

It should be understood that desirable plants for use in the present invention include those that have been mutagenized and/or genetically engineered (e.g., interspecific and/or intergeneric hybrids, genetic mutants, transgenics, etc.). Methods for mutagenizing plants are well known in the art (see, for example, Konzak et al., International Atomic Energy Agency, Vienna, 1972, pg. 95, incorporated herein by reference). Plants for use in the present invention can be genetically manipulated using known transformation techniques or using sexual and/or asexual (i.e., somatic) hybridization techniques. Hybridization techniques are well-known in the art, and have been employed, for example, to transfer agronomically important traits from related species to crop Brassicas (see, for example, Salisbury et al. *Genet. Life Sci. Adv.* 22 8:65, 1989, incorporated herein by reference).

Metals

The present invention provides methods that are useful for the remediation of a wide variety of contaminating materials. Accordingly, the term "metal" as used herein refers to metals (both stable and radioactive, both ionic and non-ionic forms), mixtures of metals, and combinations of metals with organic pollutants.

Metals that can be accumulated according to the present invention include antimony, arsenic, barium, beryllium, cadmium, cerium, cesium, chromium, cobalt, copper, gold, indium, lead, manganese, mercury, molybdenum, nickel, palladium, plutonium, rubidium, ruthenium, selenium, silver, strontium, technetium, thallium, thorium, tin, vanadium, uranium, yttrium, zinc, and combinations thereof.

Common organic pollutants relevant to the present invention include benzene or other aromatics, alkyl benzyl sulfonates (detergents), polycyclic hydrocarbons, polychlorinated biphenyls (PCBs) and/or halogenated hydrocarbons (e.g. trichloroethylene).

One advantage of the present invention is that the rapid induction of metal transport from roots to shoots allows plants to be utilized to accumulate metals that have profound negative effects on plant viability. Of course, standard cultivation techniques teach the desirability of promoting plant viability. The only metals whose uptake is typically recommended are those that are essential for plant growth (molybdenum, copper, zinc, manganese, iron; see Taiz and Zeiger, *Plant Physiology* Benjamin/Cummings Publishing Company, Inc., Redwood City, Calif., pp. 107–109, 1991). Prior art references, and indeed common sense, teach that it is undesirable, if not impossible, to use plants to take up metals that are poisonous to the plants. The present invention, however, provides induction stimuli that trigger rapid metal transport, so that detrimental effects of metal accumulation are minimized prior to induction. Thus, the present invention provides a novel method for the accumulation by plants of metals that are not essential to, and/or are detrimental to, plant growth. The present invention is particularly useful, and fills a void in existing techniques, because soils to be remediated are typically contaminated with phytotoxic metals. Examples of metal contaminants that are the primary toxic components of contaminated sites are: lead, chromium, arsenic, zinc, copper, cadmium, and nickel.

According to the present invention, lead is preferably accumulated to at least about 3000 $\mu g/g$ d.w. shoot mass, more preferably to at least about 4000 $\mu g/g$ d.w. shoot mass, and most preferably to at least about 6000 $\mu g/g$ d.w. shoot mass; zinc is preferably accumulated to at least about 1000 $\mu g/g$ d.w. shoot mass, and more preferably to at least about 2000 $\mu g/g$ d.w. shoot mass; copper is preferably accumulated to at least about 1000 $\mu g/g$ d.w. shoot mass, and more preferably to at least about 2500 $\mu g/g$ d.w. shoot mass; cadmium is preferably accumulated to at least about 500 $\mu g/g$ d.w. shoot mass, and more preferably to at least about 1000 $\mu g/g$ d.w. shoot mass; nickel is preferably to accumulated to at least about 200 $\mu g/g$ d.w. shoot mass, and more preferably to at least about 500 $\mu g/g$ d.w. shoot mass (see Example 7).

Metal-Containing Environment

The metal-containing environment in which plants are induced to hyperaccumulate is not intended to limit the scope of the present invention. That is, as long as the environment can sustain growth of the selected plants, it is suitable for the purposes of the present invention. Metal-containing environments can range from purely aquatic environments with varying degrees of water saturation, organic matter content, mineral content, etc. to well-drained soils. Thus, the term "soil", as used herein, includes a wide variety of physical types and chemical compositions.

Plant Cultivation

Various techniques for plant cultivation are well-known in the art (see, for example Canola Growers Manual, Canola Council of Canada, 1984, incorporated herein by reference). Plants can be grown in soil, or alternatively can be grown hydroponically (see, for example, U.S. Pat. No. 5,364,451; U.S. Pat. No. 5,393,426; U.S. Ser. No. 08/252,234 now U.S. Pat. No. 5,785,735; U.S. Ser. No. 08/359,811 now abandoned; U.S. Ser. No. 08/423,827 now abandoned; and U.S. Ser. No. 08/443,154, each of which is incorporated herein by reference).

Whereas the goal of cultivation in an ordinary crop plant for typical agricultural use is to maximize the crop yield, the goal when practicing this invention is to increase in an undifferentiated fashion the amount of above-ground biomass prior to induction. That is, the biomass of importance to the effectiveness of the invention is the undifferentiated amount of biomass produced, in contrast to, for example, in corn, the desire to achieve the maximum yield of edible material. It also should be recognized, as elaborated above, that maximum crop yield per se should not be the sole selection criteria, because it must be balanced with the concentration of metal in shoots upon accumulation.

The optimal amount of time that a plant should be cultivated before application of the inducing stimulus according to the present invention will vary depending on the type of plant, the metal being accumulated, and the character of the environment in which the plant is being grown. For example, where Brassica juncea is being utilized to accumulate lead, it is generally desirable to cultivate the plants for at least three weeks, and preferably four to six weeks, after emergence of the plants before applying the induction stimulus (see, for example, Examples 2 and 5)

Soil Manipulation

As mentioned above, it is often desirable in the practice of the present invention to take steps to increase the availability of metal in the soil to the plant, and/or to reduce the likelihood of metal precipitation at or in the plant roots. The overall goal, of course, is to have the largest possible amount of metal accumulated into the plant roots and available for transport into the shoots.

The term "increase the availability of metal", as used herein, refers to rendering metals in an environment more amenable to plant root uptake, and/or to subsequent shoot transport, than they would be in the absence of the manipulation. Manipulations that can increase the availability of metal to plants include, for example, (i) addition of chelators to the soil; (ii) tilling of soil to bring metal containing soil into contact with the plant root zone; (iii) decreasing pH of the metal-containing environment, for example by adding an effective amount of an organic or inorganic acid (such as, for example, nitric acid, acetic acid, and citric acid), or by adding to the environment a compound, such as ammonium sulfate, that will be metabolized by the plant roots (and/or by associated bacteria or other component(s) of the rhizosphere) in a manner that produces protons and thereby reduces the soil pH (see, for example, U.S. Ser. No. 08/252, 234, incorporated herein by reference; see also Example 10).

As noted above, certain of these manipulations that increase soil availability (e.g., addition of chelators and acidification of soil) also can serve as inducing agents that stimulate metal transport to the shoots. The effects of these agents on metal transport are distinct from their effects on metal availability (see below).

Given that it is often useful to increase the availability of metals to plants, it is also typically desirable to avoid taking measures that would reduce such availability. For example, when delivering phosphate fertilizers to plants, it is typically desirable to employ techniques, such as spot or foliar fertilization, that will minimize formation of insoluble metal phosphates.

Induction Stimulus

Any of a variety of agents applied to the soil and/or to plant foliage can be used to induce metal hyperaccumulation in plant shoots, in accordance with the present invention. Desirable inducing agents, used either alone or in combination, include metal chelators, organic and inorganic acids, herbicides, plant growth regulators, and other phytotoxic compounds.

Chelators

We have observed that exposure to a chelating agent can effectively induce metal hyperaccumulation in plant shoots. In particular, we have found that exposure to ethylenediaminetetraacetic acid (EDTA) and other chelating agents well known to those skilled in the art induces hyperaccumulation of lead in shoots of B. juncea cultivar (see Examples 1 and 2).

As discussed above, chelators such as EDTA improve metal solubility in the soil, and thereby increase availability of the soil metals to the plant. This increase in metal solubility presumably increases the amount of metal accumulated in the plant. However, the evidence presented in Examples 1 and 2 shows clearly that EDTA has an effect on metal accumulation into shoots that is beyond any effect it has on metal availability because the observed hyperaccumulation of lead into plant shoots does not increase linearly with EDTA concentration, as would be expected for a solubility effect. Rather, lead uptake increases dramatically above a threshold level (greater than about 0.3 mmol/kg at pH 5.1 and greater than about 1.0 mmol/kg at pH 7.5 in Example 2). Thus, we have demonstrated that EDTA induces hyperaccumulation of lead into plant shoots by stimulating transport of root-accumulated material.

Various chelating agents other than EDTA are known in the art and have been used in plant cultivation as a source of micronutrients or to enhance solubility of essential metals. The present invention teaches that, in addition to these known uses of chelators in plant cultivation, chelators are also useful to induce metal hyperaccumulation into plant shoots if applied in the manner described. One of ordinary skill in the art will appreciate that other metal chelating or complexing agents such as, for example, ethylene glycol-bis($\beta$-aminoethyl ether) N,N,N',N'-tetraacetic acid (EGTA), diethylenetriaminepentaacetic acid (DTPA), trans-1,2-diaminocyclohexane-N,N,N',N;-tetraacetic acid (CDTA), N-hydroxyethylethylenediaminetriacetic acid (HEDTA), nitrilotriacetic acid (NTA), citric acid, salicylic acid, and malic acid, can desirably be used in accordance with the present invention, and can follow the teachings of the present specification to screen and identify particular chelators and conditions that may be preferred for specific applications.

With this in mind, we note that an extensive literature exists on the selection and specificity of synthetic and natural chelate binding affinities for specific cations in soil and water systems (see Lindsay, *Chemical Equilibria in Soils*, Wiley Interscience, New York, 1979; Norvell, *Soil Sci. Soc. Am. J.* 48:1285, 1984; Norvell, *Micronutrients in Agriculture, Second Edition*, Soil Science Society of America Book Series No. 4, Soil Science Society of America, Madison, Wis., 1991; Sommers et al., *Soil Sci. Soc. Am. J.* 43:39, 1979). In addition, several computer software packages have been developed to aid the evaluation of solid and solution phase equilibria in the soil system in the presence of added chelates (Loeppert et al. *Chemical Equilibrium and Reaction Models*, Soil Science Society of America Special Publication Number 42, Soil Science Society of America and American Society of Agronomy, Madison, Wis., 1995).

Acidification

Example 3 reports our finding that exposure of *B. juncea* plants to pH 3.5 in solution culture induces hyperaccumulation of lead in plant shoots. We also present data in Example 4 demonstrating that the sequential administration of an acid and EDTA induces higher levels of lead accumulation in *B. juncea* shoots than are induced by administration of either the acid or EDTA alone. Furthermore, Example 5 demonstrates that a combination of acid and EDTA induces metal transport into shoots effectively in a field environment. This finding is particularly significant because large-scale acidification of soil to pH 3.5 may well be impractical in soil sites. The data presented in Example 5 demonstrate that such large-scale acidicifation is not required. Some level of acidification (we note that the quantities of acid used in Example 5 only slightly reduce the soil pH) is still valuable due to its synergistic effects when combined with another inducing agent such as a chelator.

We note that standard techniques of plant cultivation in soils recommend that pH be maintained between about pH 5.5 and pH 7.0 for optimum growth of most crops. In fact, a large literature has developed that describes how best to treat different types of soil to ensure that a desirable pH is maintained (see, for example, Commercial Vegetable Production Recommendations, Reiners and Garrison, eds., Rutgers, State University of New Jersey, 1994, pp. 18–27; "Agronomy of Canola in the United States", pp. 25–35 in Canola and Rapeseed, Production, Chemistry, Nutrition, and Processing Technology, ed. F. Shahidi, Van Nostrand Reinhold, New York, 1990, each of which is incorporated herein by reference).

Thus, according to the present invention, a soil pH greater than about 5.5 is desirable in the initial cultivation stage during which most of the biomass is accumulated. This initial cultivation stage is followed by a reduction in pH to induce metal accumulation. As described in the Examples, soil pH is preferably reduced to about pH 3.5, though less dramatic pH reductions are also desirable, especially when an additional inducing agent is employed. In fact, any acidification (either localized or general) of the soil-root system is expected to be beneficial to the induction mechanism when used in combination with other inducing agents, regardless of its ability to stimulate induction in the absence of other inducing agents.

The principles exemplified by the data in Examples 3 and 5 are, of course, not limited to *B. juncea* nor to the precise cultivation and/or induction conditions described. For example, different pH ranges may be optimal for induction in different plants. One of ordinary skill in the art can readily follow the teachings of the present specification to screen different plants and conditions and identify those combinations that result in induction of hyperaccumulation in plant shoots.

Also, as reported in the Examples, solution pH was reduced by application of 1.0 N $HNO_3$. Alternate acidifying agents (such as, for example, acetic acid, ammonium acetate, ammonium sulfate, ferrous sulfate, ferrous sulfide, elemental sulfur, sulfuric acid, citric acid, ascorbic acid) can be used to reduce the soil pH. Also, soil pH can be reduced by addition of a metabolite that is processed by the roots or other element of the rhizosphere in a manner that produces protons (see above). Preferred acidifying agents are those that chemically or biologically degrade within days or weeks without leaving residual salts that may either result in an undesirable buildup of salinity (i.e., ammonium, chloride or sodium) or create a potential environmental hazard from leaching of the associated anions (i.e., nitrate from nitric acid). Particularly preferred acidifying agents include, but are not limited to, acetic acid, citric acid, or ascorbic acid.

Herbicides

The application of selected herbicides to *B. juncea* plants grown in heavy metal contaminated soil amended with chelators induced hyperaccumulation of metals in plant shoots (see Examples 5–7). Examples 5–7 demonstrate that several different commercially available herbicides can be used in accordance with the present invention to induce hyperaccumulation of metals in plant shoots. It is worth noting that herbicides did not effectively induce hyperaccumulation in soil environments in the absence of an agent (e.g., acid or chelator) that increased metal availability to the plants (see FIG. 4). This finding is consistent with our model that metals first accumulate in the plant roots, and that the induction stimulus induces transport to the plant shoots. Of course, one of ordinary skill in the art will recognize that, in a system where metal availability is not a problem (for example, in a hydroponic system), herbicides, and other inducing agents that do not also increase metal availability, may still effectively induce metal hyperaccumulation in plant shoots.

In preferred embodiments of the present invention, reflected in the Examples, herbicides are applied as inducing agents only after the plants have first been exposed to an agent that increases metals availability (e.g., acid and/or chelator). Furthermore, a delay (e.g., 24 hours) is desirably imposed between the application of the treatment that increases metal availability and the application of the herbicide. The idea is to allow metals to accumulate in the roots during application of the treatment that increases metal availability, and then to induce transport of root-accumulated metal into the shoots by application of the herbicide. In light of the data presented in the Examples, it is clear that a particularly preferred embodiment of the present invention involves sequential application of EDTA and herbicide (e.g., Roundup™), with a delay in between.

Those of ordinary skill in the art will recognize that any of a variety of herbicides other than those specifically presented in the Examples are useful inducing agents in accordance with the present invention. Preferred herbicide compounds have little or no soil residual activity and decompose quickly in the environment. Such preferred compounds include commercially available formulations containing, for example, glyphosate, 2,4-dichlorophenoxyacetic acid (2,4-D), 2-methyl-4-chlorophenoxyacetic acid (MCPA), or maleic hydrazide.

Other Agents

Those of ordinary skill in the art will readily recognize that any of a variety of other agents can be used as inducing agents in the practice of the present invention. According to our theory, any agent that disrupts plant metabolism in a way that overrides the natural protective mechanisms that block root-to-shoot transport of phytotoxic materials will be effective in inducing metal hyperaccumulation in plant shoots. Consistent with this hypothesis, we have found that high levels of heavy metals can also function as inducing agents according to the present invention (see Examples 8–9). Significantly, as can be seen with reference to Examples 8 and 9, hyperaccumulation is only induced above a threshold level of metal.

The present invention therefore teaches that exposing plants to a physiological stress or phytotoxic substance (e.g. phytotoxic levels of metals or nutrients, low pH, osmotic stress, herbicide, etc.) or combination of such substances, disrupts the plant's natural safety mechanisms normally involved in preventing uptake and/or transport of toxic substances into plant shoots and stimulates metal translocation from the roots to the shoots. Thus, according to the present invention, any agent with phytotoxic activity can be screened to test its ability to induce metal hyperaccumulation in plant shoots according to the procedures described herein.

For example, any or all chelating agents (e.g., EDTA, EGTA, DTPA, CDTA, citric acid, salicylic acid, malic acid), soil acidifiers (e.g. acetic acid, ammonium acetate, ammonium sulphate, ferrous sulfate, ferrous sulfide, elemental a sulfur, sufuric acid, citric acid, asorbic acid), phytotoxic levels of plant nutrients and trace elements (Fe, Mn, Na, Al, etc.), and commercially available herbicides (containing e.g., glyphosate, MCPA, maleic hydrazide) alone or in combination with one another, can be tested for their inducing capabilities, as can other chemical agents such as other toxins, detergents, enzymes, and plant hormones, or physical factors such as drought, extreme heat, ultraviolet radiation, and x-radiation. Also, any of these agents can be tested under conditions of nutritional starvation, but starvation alone is not sufficient to induce metal hyperaccumulation into plant shoots.

Those of ordinary skill in the art can readily screen any or all of these materials for inducing capability according to the procedures described herein. Desirable agents are those that stimulate a plant to accumulate metal in its shoots to a level higher than the plant would accumulate in the absence of the agent. Preferably, the agent stimulates the plant to accumulate at least about two-fold more metal in its shoots than the plant would do if not exposed to the agent.

Harvesting

Plant shoots into which metals have been hyperaccumulated in accordance with the present invention are harvested by any of a variety of standard techniques, such as swathing, chopping, or baling. Shoot harvesting from certain Brassica species, such as B. campestris, B. juncea, and B. napus, in particular is routine (see, for example, Canola Growers Manual; Canola Council of Canada, 1984, incorporated herein by reference).

Often, in the practice of the present invention, it is desirable to produce multiple crops in a single growing season, in order to effect the greatest amount of metal removal on a given site. Thus, it is typically desirable to harvest shoots promptly after the completion of the induction process, in order to waste no time in a limited growing season. The induction process is complete when leaves of the plant become desiccated and begin to drop. To prevent undue loss of metal-rich plant material, harvest should begin at the first sign of leaf desiccation and/or leaf drop, and should be completed without delay thereafter.

EXAMPLES

Example 1

Inducing Hyperaccumulation of Lead by Addition of EDTA

Materials and Methods:

Seeds of B. juncea cultivar 426308, obtained from the USDA/ARS Plant Introduction Station of Iowa State University, were cultivated hydroponically in open-ended 1.7 mL microcentrifuge tubes packed with 1 $cm^3$ of vermiculite, so that the roots of cultivated plants extended into an aerated nutrient colution of 1 g/L Hydrosol™ supplemented with $Ca(NO_3)_2$. During cultivation of the seedlings, six tubes supported by a floating styrofoam platform were placed in an 18 L tray containing 15 L of solution. Experiments were done in an environmentally controlled growth chamber at 25° C., 75% relative humidity, and a 16 hour photoperiod was provided by a combination of incandescent and cool-white fluorescent lights.

After three weeks, plants were rinsed in deionised water for 20 minutes and then were transferred to a container with 750 mL of metal-contaminated solution. Lead nitrate was used to obtain a 50 mg Pb/L solution. The solution concentration remained constant for the duration of the experiment. EDTA was added to experimental chambers to a concentration of either 0.2 mM or 1.0 mM, by addition of 0.5 M EDTA stock solution. Plants were exposed to the lead-contaminated solution, in the presence of EDTA, for 7 days, and then were harvested.

Plant roots and shoots were harvested separately, dried for 48 hours at 70° C. in a forced air oven, weighed, ground, and wet digested with nitric and perchloric acids. At least 4 replicates were used for each treatment.

The metal content of the extracted acid was determined with a Fisons Direct Current Plasma Spectrometer, model SS-7.

Results and Discussion

Figure 1B:
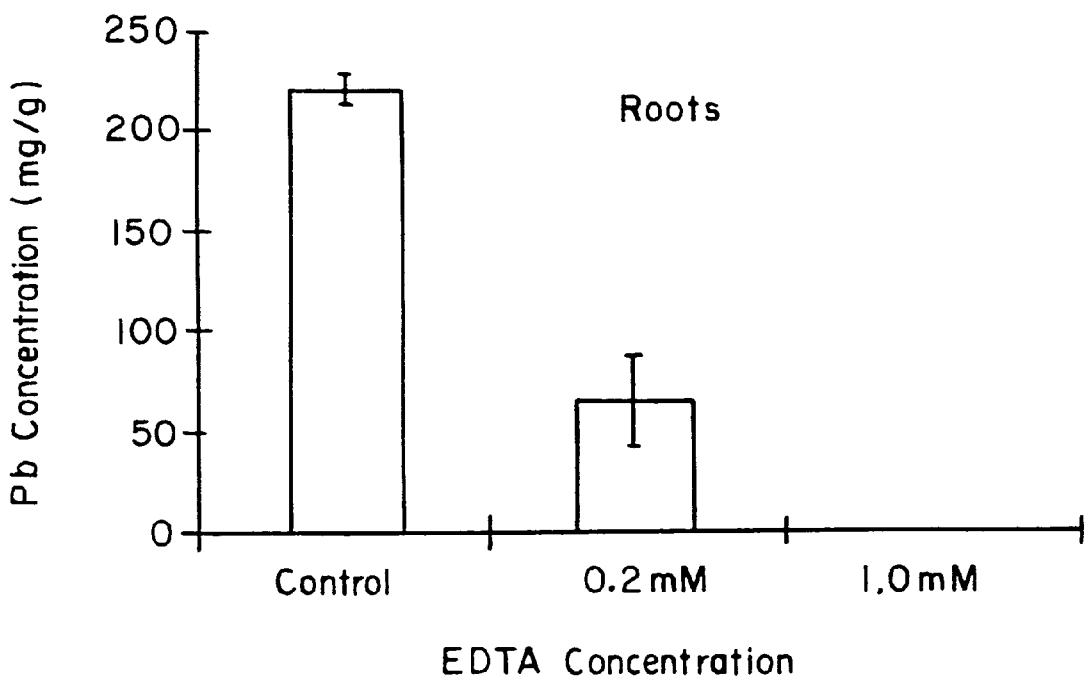

Results are presented in FIG. 1. As can be seen, in the absence of EDTA, soluble lead in the solution is accumulated into plant roots, but is not transported to the shoots in appreciable amounts. By contrast, addition of EDTA results in high levels of accumulation in plant shoots, so that a reduced amount of lead remains in the plant roots. This phenomenon is not explained by EDTA's known capability to solubilize metals in the soil solution, since the metal was already dissolved in the test solutions. The hyperaccumulation of metal and transport to shoots is apparently related to the stress on the plant caused by EDTA, which has phytotoxic effects at high concentrations.

We note that the results presented in FIG. 1 also show that lead accumulation into roots is increased in the presence of EDTA, evidencing an ability of EDTA to increase metal availability even in this hydroponic system. This finding suggests that EDTA has effects not only on metal solubility in soil, but also on metal solubility on and/or inside plant roots, so that EDTA helps maintain the metal in a form (perhaps an EDTA/metal complex), that is suitable for shoot transport. The chelator may also act to bind calcium at the root surface, thereby reducing metal precipitation, and/or to increase membrane permeability, thereby allowing less restricted movement of metal into the root.

Example 2

Addition of EDTA to Soil

Materials and Methods:

A Sassafras Ap silt loam soil was collected from the Rutgers University Horticultural Farm and amended with lead carbonate. The soil was limed to pH 5.1 or 7.5, and was fertilized with urea (150 mg N/kg), potassium chloride (100 mg KCl/kg), and gypsum (70 mg $CaSO_4$/kg). The soil was allowed to equilibrate for two weeks in the greenhouse at saturation, air dried, and remixed before planting. The soil was placed in 8.75 cm diameter pots (350 g soil/pot) and planted with *Brassica juncea* (426308) seeds. Phosphate fertilizer was added as a spot placement 1 cm below the seeds at planting at the rate of 100 mg $P_2O_5$/kg. After seedling emergence, the pots were thinned to two plants per pot.

Plants were grown for three weeks in a growth chamber with a 16 hour photoperiod and were given weekly fertilization treatments of 16 and 7 mg/kg N and K, respectively. Three weeks after seedling emergence, chelate (EDTA as a K salt) solutions were applied to the soil surface. The pots were placed in individual trays to prevent loss of amendments from leaching. Following the chelate applications, the soil was irrigated to field capacity on a daily basis. The plants were harvested one week after the chelate treatment by cutting the stem 1 cm above the soil surface. The plant tissue was dried and analyzed for metal content by ICP as described previously in Example 1.

Results and Discussion:
Results are presented in Table 1:

TABLE 1

| Pb uptake by the shoots of *B. juncea* from soil amended with EDTA. | |
|---|---|
| EDTA mmol/kg | Pb Uptake into Shoots μg/g |
| Sassafras Ap soil (pH 5.1) | |
| 0.3 | 917 ± 221 |
| 0.5 | 3066 ± 1362 |
| 1.0 | 6748 ± 1842 |
| 2.5 | 8162 ± 2501 |
| 5.0 | 11740 ± 3802 |
| 7.5 | 15321 ± 1491 |
| Sassafras Ap soil (pH 7.5) | |
| 0.0 | 15 ± 1 |
| 1.0 | 243 ± 35 |
| 2.5 | 1398 ± 560 |
| 5.0 | 5590 ± 1916 |

As can be seen, accumulation of lead into the shoots was not a linear response to the amount of EDTA added to the soil. This finding indicates that the effect of EDTA was not due solely to the chelator's ability to increase metal solubility in the soil.

Example 3

Inducing Hyperaccumulation of Lead by Altering pH

Materials and Methods:

Seeds of *Brassica juncea* cultivar 426308 were obtained from the USDA/ARS Plant Introduction Station of Iowa State University.

Seedlings were cultivated hydroponically in open-ended 1.7 mL microcentrifuge tubes packed with 1 $cm^3$ of vermiculite, with roots extending into an aerated nutrient solution [1 g/L Hydrosol™ supplemented with 0.6 g/L $Ca(NO_3)_2$]. During cultivation of the seedlings, six tubes supported by a floating styrofoam platform were placed in an 18 L tray containing 15 L of solution. Experiments were done in an environmentally controlled growth chamber at 25° C., 75% relative humidity, and a 16 hour photoperiod provided by a combination of incandescent and cool-white fluorescent lights.

After three weeks, plants were rinsed in deionized water for 20 minutes and then transferred to a container with 750 mL of contaminated solution. Lead nitrate was used to obtain 50 mg Pb/L solution. Solution concentration remained constant for the duration of experiment. Solution pH was adjusted to either pH 5.5 or pH 3.5 by addition of 1.0 N $HNO_3$. Plants were exposed to the lead contaminated solution, under the low-pH conditions, for 7 days, and then were harvested.

Figure 2A:
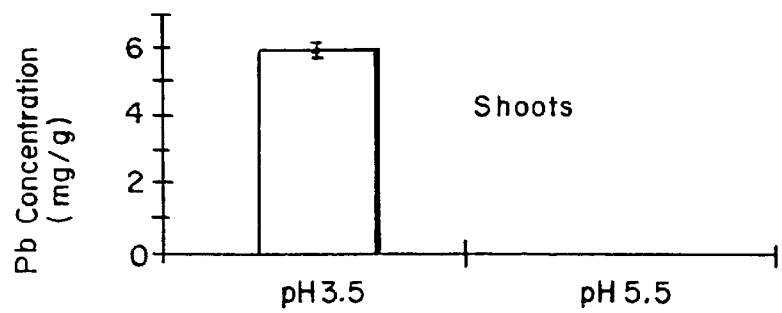
FIG. 2 is a bar graph showing the effects of acidification on lead accumulation in roots and shoots of a *Brassica juncea* cultivar after acidification to pH 3.5.
Figure 2B:
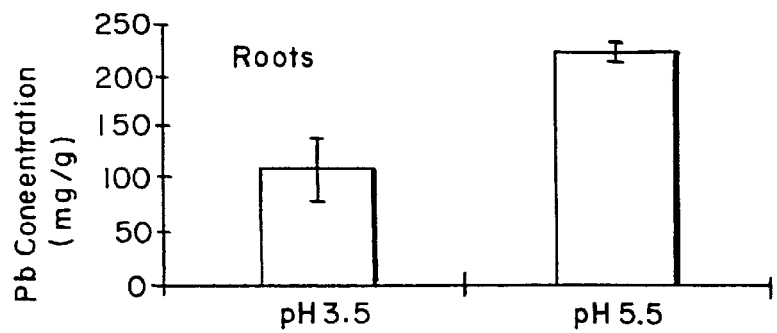

Roots and shoots were harvested separately, dried for 48 hours at 70° C. in a forced air oven, weighed, ground, and wet digested with nitric and perchloric acids. At least 4 replicates were used for each treatment The metal content of the acid extract was determined with a Fisons Direct Current Plasma Spectrometer, model SS-7.
Results and Discussion:

Results are presented in FIG. 2. As can be seen, reducing the pH of the contaminated solution from 5.5 to 3.5 dramatically changed the amount of lead taken up by *B. juncea* shoots. Plants exposed to 50 mg/L lead solution at a pH of 3.5 accumulated 6 mg/g lead, some 100 times the amount taken up at a pH of 5.5. This phenomenon cannot be explained by increased lead solubility, since the soluble lead remained at 50 mg/L during the entire experimental period at either pH level.

Example 4

Synergistic Induction of Lead Hyperaccumulation by Exposure to a Sequence of Altered pH and EDTA Materials and Methods:

Experiments were performed as described above in Example 3 except that, after the plants were exposed to the lead-containing solution at the adjusted pH, EDTA was added. Four different reaction conditions were utilized:

a. Control: pH=5.5, no EDTA addition
b. pH=5.5, EDTA added at 0.2 mM
c. pH=3.5, no EDTA addition
d. pH=3.5, EDTA added at 0.2 mM pH of the solutions was adjusted using a 1.0 N $HNO_3$ solution. EDTA was added after pH adjustment using 0.5 molar stock solution. At least 4 replicates were used for each treatment.

Figure 3A:
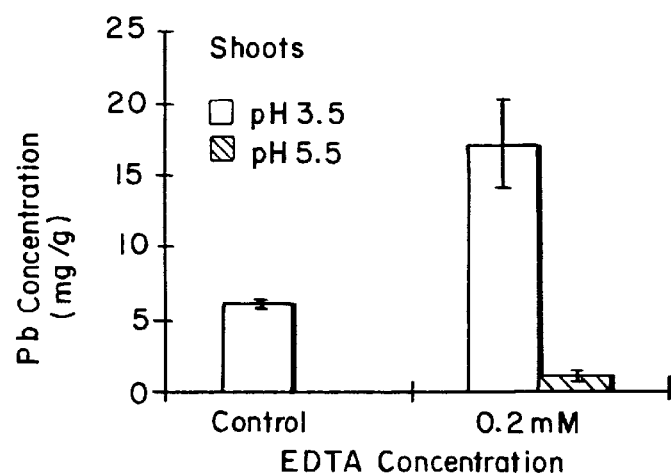
FIG. 3 is a bar graph showing the combined effects of EDTA and acidification on lead accumulation in roots and shoots of a *Brassia juncea* cultivar.
Figure 3B:
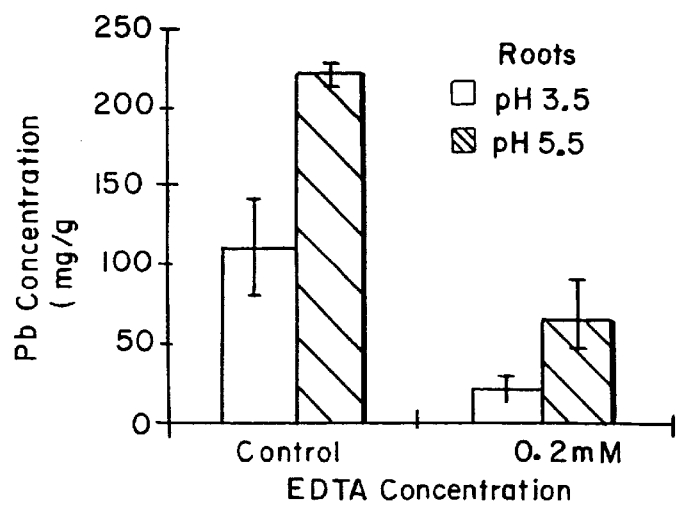

Results and Discussion:

Results are presented in FIG. 3. As can be seen, the combination of low pH (3.5) and EDTA application has a synergistic effect. The sequence of pH adjustment to 3.5 followed by a dosage of EDTA results in hyperaccumulation levels much higher than the use of a single addition of EDTA or of acid. The lead concentration in dried shoots of 1.7% and the corresponding bioaccumulation coefficient[1] of 340 achieved with the combination of pH 3.5 and addition of EDTA are higher than any values reported in Examples 1–3.

[1]Bioaccumulation coefficient=($\mu$g metal uptake/g of dry shoot mass) divided by either (mg metal in substrate/kg dry weight of soil) or (mg metal in substrate/L of solution), depending on whether the system is soil-based or hydroponic.

Example 5

Effect of Acid/Chelator/Herbicide Sequences in Inducing Lead Hyperaccumulation in Field Trial Site Materials and Methods:

A field study was conducted at a site in Bayonne, N.J. with Pb contaminated soil (1200 mg Pb/kg). Soil was fertilized with 150, 100, and 70 mg/kg of N, $K_2O$, and $CaSO_4$, respectively. The surface soil (0–15 cm) was excavated and placed in lysimeters (48 qt ice chests). 65 kg of soil was placed in each lysimeter and the lysimeters were placed on the surface of the soil in the field. B. juncea seeds were planted and grown for 3 weeks before treatment application. EDTA and acetic acid were applied as 1 L solutions to equal 5.0 mmol/kg of EDTA and acetic acid. Herbicide treatments were applied 24 hours after the EDTA and acetic acid treatments using a 12.5% Rockland™ (a mixture of Prometon and 2,4-D) solution to wet the foliage. Plants were harvested one week after treatment application. Root and shoot tissue was collected and washed to remove soil deposition before analysis.

Figure 4A:
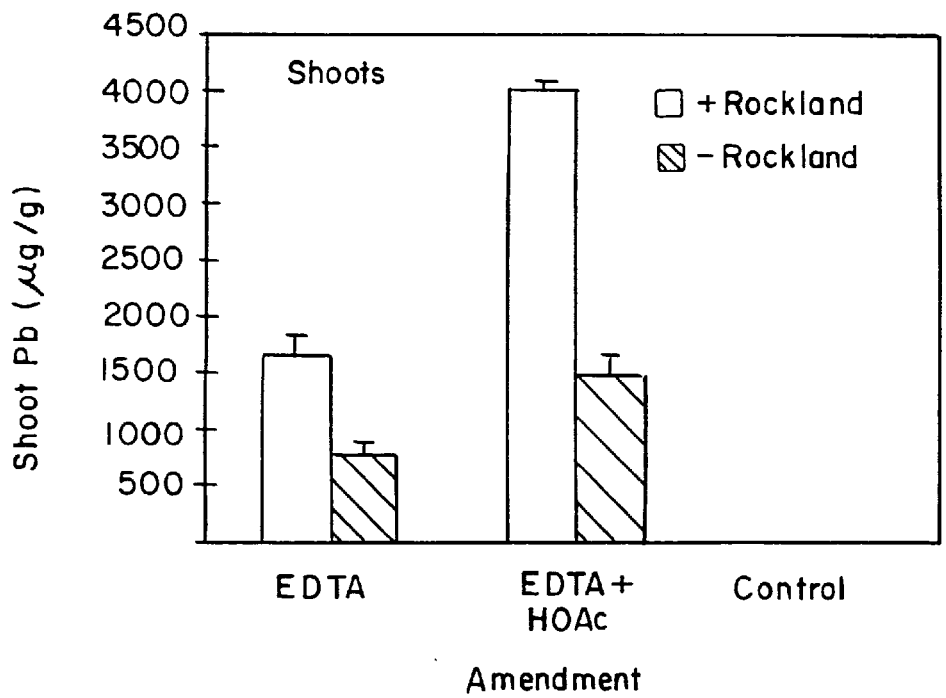
FIG. 4 is a bar graph showing the combined effects of EDTA, acidification, and an herbicide on lead accumulation in roots and shoots of a *Brassia juncea* cultivar.
Figure 4B:
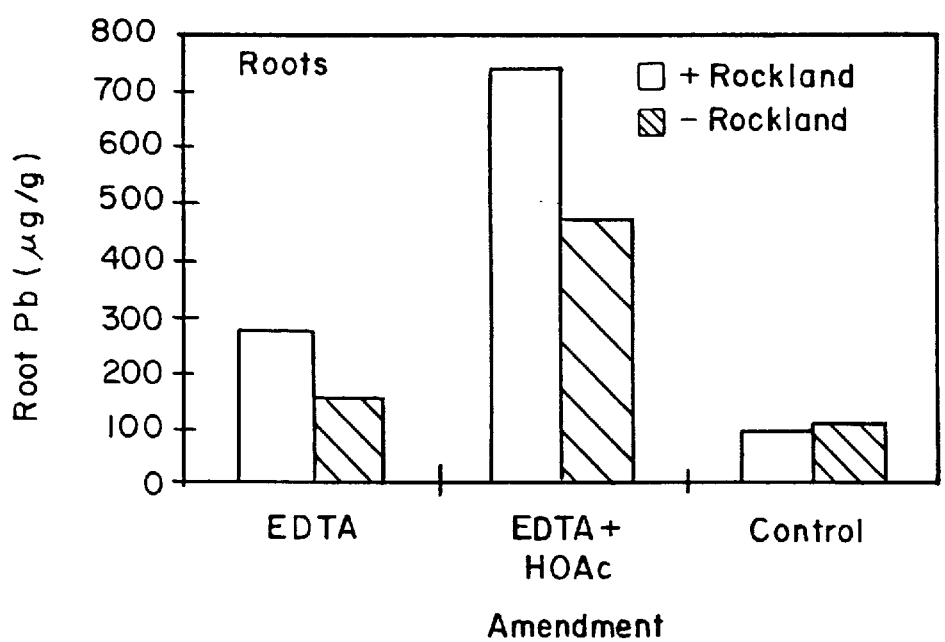

Results and Discussion:

Results are presented in FIG. 4. As can be seen, addition of acid in conjunction with EDTA results in synergistic induction of lead uptake into shoots. These findings are particularly significant because they represent an effect that occurs in the field, at a contaminated site. These findings therefore show that the present invention is practical for phytoremediation of contaminated sites.

Example 6

Addition of Sequence of Chelator and Herbicide to Soil

Materials and Methods:

Soil was prepared and plants were grown as described in Example 2. After three weeks of growth, EDTA was applied to the soil solution at the rate of 2.5 mmol/kg. Twenty-four hours after the chelate solutions were applied, herbicide solutions of Paraquat, Roundup™ (glyphosate), or Rockland™ were applied in various concentrations to wet the foliage. Plants were maintained as described in Example 2, and were harvested 7 days after the chelate application.

Results and Discussion:

Results are presented in Table 2:

TABLE 2

Pb uptake into shoots of B. juncea in soil amended with EDTA and herbicide

| Herbicide | Concentration % (v/v) | Pb Uptake $\mu$g/g |
|---|---|---|
| Control (EDTA alone) | 0.0 | 1178 ± 579 |
| Paraquat | 0.5 | 6216 ± 1027 |
|  | 2.0 | 3099 ± 344 |
|  | 5.0 | 3606 ± 48 |
| Rockland ™ | 12.5 | 4710 ± 484 |
|  | 18.3 | 3955 ± 457 |
|  | 25 | 3479 ± 246 |
| Roundup ™ | 1.5 | 6682 ± 1461 |
|  | 5.0 | 4939 ± 1004 |
|  | 10 | 4390 ± 1216 |

As can be seen, sequential addition of EDTA and an herbicide results in synergistic effects on induction of metal hyperaccumulation into plant shoots.

Example 7

Effect of EDTA and Herbicide Applications on Induction of Hyperaccumulation of Various Metals from Contaminated Soil Materials and Methods:

The Sassafras Ap soil was amended with oxide and carbonate forms of Cd, Cu, Ni, Pb, and Zn and prepared as in Example 2. Chelate solutions were applied with an herbicide application of 2,4-D as described in Example 5.

Figure 5:
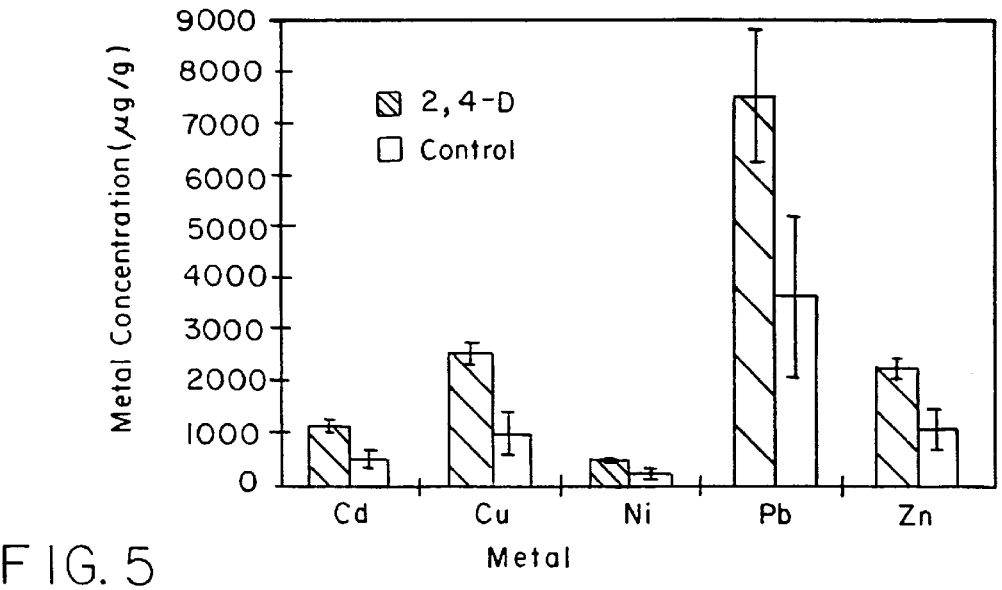
FIG. 5 is a bar graph showing the combined effects of EDTA and an herbicide on metal accumulation in roots and shoots of a *Brassia juncea* cultivar; the data demonstrate hyperaccumulation of cadmium, copper, nickel, lead, and zinc.

Results and Discussion:

Results are presented in FIG. 5. As can be seen, the combination of EDTA and an herbicide induced hyperaccumulation of a variety of different metals. The 2,4-D herbicide induced hyperaccumulation of all metals.

Example 8

Inducing Hyperaccumulation by Exposure to High Concentrations of Metal

Materials and Methods:

Twelve different species of plants as listed in Table 3 below were tested. Seeds of Brassica species including B.

nigra, B. oleracea, B. campestris, B. carinata, B. juncea and B. napus were obtained from the Crucifer Genetics Cooperative, Madison, Wis. Seeds of other plants were purchased from local seed markets.

Seedlings were grown in a greenhouse equipped with supplementary lighting (16 h photoperiod; 24–28° C.; see Kumar et al. *Environ. Sci. Technol.* 29:1232–1238, 1995, incorporated herein by reference). Seedlings were grown for 10 days in acid-washed coarse sand and fertilized every two days either with full-strength Hoagland's solution or with 1 g/L Hydrosol™ supplemented with 0.6 g/L $Ca(NO_3)_2$. Ten-day-old seedlings were transplanted (in sets of two) into 150 g dry weight (DW) of an acid-washed 1:1 (v/v) mixture of coarse sand and coarse Perlite placed in 3.5 inch round plastic pots. The pots contained two different levels of lead: 0.0625 mg/kg or 0.625 mg/kg dry weight sand/Perlite. Each pot contained two seedlings. At least four replicates for each metal concentration were used.

Every other day the plant leaves were fertilized with Miracle Gro™ solution until most of the leaves were wet. Phosphates and sulfates were not used, to avoid precipitation of Pb and other heavy metals.

Plants were grown for 14–20 days. Shoots of metal-treated and control plants were harvested and washed thoroughly with running tap water. Plant tissue was cut into small pieces with scissors, dried for 2 days at 80° C. and ashed in a muffle furnace at 500° C. for 6 h. The ash was dissolved in a mixture of 2M HCl and 1M $HNO_3$. The metal content of the acid extract was determined with a Fisons Direct Current Plasma Spectrometer, model SS-7.

Results and Discussion

Table 3 below compared the accumulation of Pb in shoots of the 12 species tested at two different levels of Pb.

TABLE 3

Metal uptake in shoots and bioaccumulation coefficient

| | Lead level of substrate sand/Perlite mixture mg/kg dry weight | | | |
|---|---|---|---|---|
| | 62.5 | | 625 | |
| | $\mu$g/g | Coefficient | $\mu$g/g | Coefficient |
| Brassica juncea (L.) Czern. | 30 | 0.5 | 10,300 | 16.5 |
| B. nigra (L.) Koch | 30 | 0.5 | 9400 | 15.0 |
| B. campestris L. | 30 | 0.5 | 7200 | 11.5 |
| B. carinata A. Br. | 40 | 0.6 | 4600 | 7.4 |
| B. napus L. | 30 | 0.5 | 3400 | 5.4 |
| B. oleracea L. | 50 | 0.8 | 600 | 1.0 |
| Helianthus annuus L. | | | 5600 | 9.0 |
| Nicotiana tabacum L. | | | 800 | 1.3 |
| Sorghum bicolor L. | | | 300 | 0.5 |
| Amaranthus hybridus L. | | | 300 | 0.5 |
| A. paniculata L. | | | 400 | 0.6 |
| Zea mays L. | | | 200 | 0.3 |

This experiment, and the experiments reported in Example 9 below, demonstrates that heavy metal can be used as an agent to induce hyperaccumulation of metals into plant shoots. As can be seen, induction does not occur unless the concentration of the metal in the environment is above a threshold level.

Specifically, the data presented above in Table 2 show that low levels of available lead (e.g., less than 62.5 mg/Kg in this Example) in the growth medium do not induce metal hyperaccumulation in shoots for any species tested; witness that concentrations of lead in shoots do not exceed 50 $\mu$g/g DW in plants exposed to 62.5 mg Pb/Kg, and the bioaccumulation coefficient for these plants remains below 1.0. By contrast, plants exposed to a ten-fold higher concentration of lead in the environment (here 625 mg/Kg) show completely unexpected, and disprorportionately high levels of lead accumulation in plant shoots. The level of lead uptake observed—to as much as 1% of shoot dry weight—is unprecedented.

We note that most of the Brassica species we tested are induced to hyperaccumulate lead in their shoots after exposure to high lead levels. Among the other species tested, only sunflower (*Helianthus annuus*) and tobacco (*Nicotiana tabacum* L.) had bioaccumulation coefficients above 1.0. Sunflower, like many of the Brassicas, is an excellent plant for hyperaccumulation and thus phytoextraction.

The finding that high concentrations of heavy metals can serve as inducing agents to stimulate metal hyperaccumulation in plant shoots, when taken in light of the other findings reported in the present application, may influence decisions regarding strategies for phytoremediation of contaminated sites. For example, as discussed above, we have found that multiple inducing agents can act synergistically to stimulate metal hyperaccumulation in plant shoots. Thus, one of ordinary skill in the art will recognize that the levels of, for example, acid or chelating agent that can desirably be employed to induce metal hyperaccumulation at a site may well vary depending on the concentration of metal already present in the site, as the metal itself may contribute to the induction effect. Furthermore, it may well be the case that high levels of one type of metal can induce plants to hyperaccumulate other types of metal that are not present in such high concentrations in the environment. Regardless, the present invention teaches that high levels of heavy metals can act as an inducing agent to stimulate metal hyperaccumulation in plant shoots.

Example 9

Induction of Hyperaccumulation by Varying Lead Levels

Materials and Methods:

*B. juncea* cultivar 182921 was employed in experiments in which plants were grown hydroponically in a manner similar to that described above in Example 1. Roots of 17-day-old seedlings were exposed to 400 mL of aqueous solution containing varying amounts of lead (0, 6, 22, 47, 94 or 188 mg Pb/L). After an additional 14 days, plants were harvested. Metal content of plant parts was analyzed using the procedures detailed in Example 8.

Figure 6:
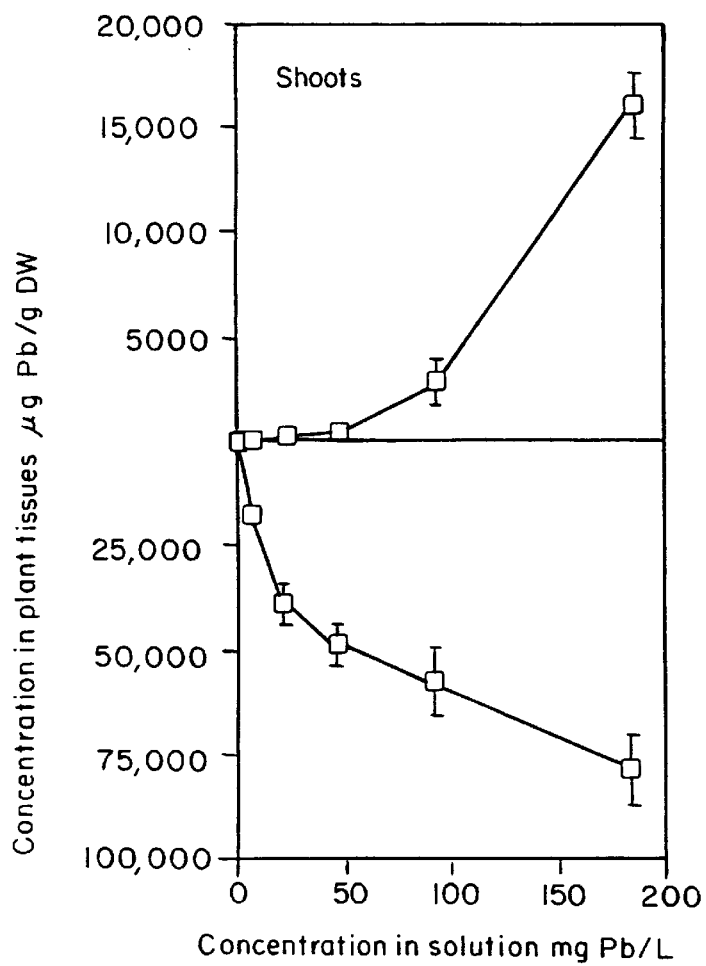
FIG. 6 shows the induction of lead hyperaccumulation in shoots of a *Brassica juncea* cultivar after exposure to high levels of a heavy metal.
Figure 7:
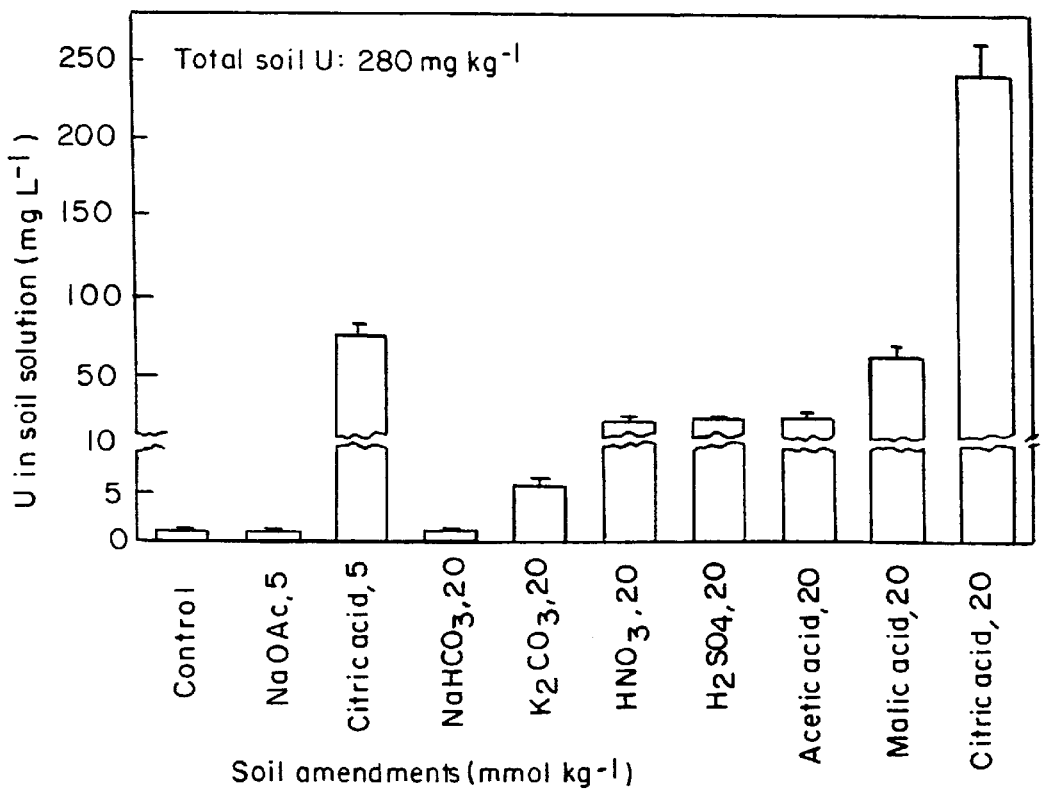
Figure 8:
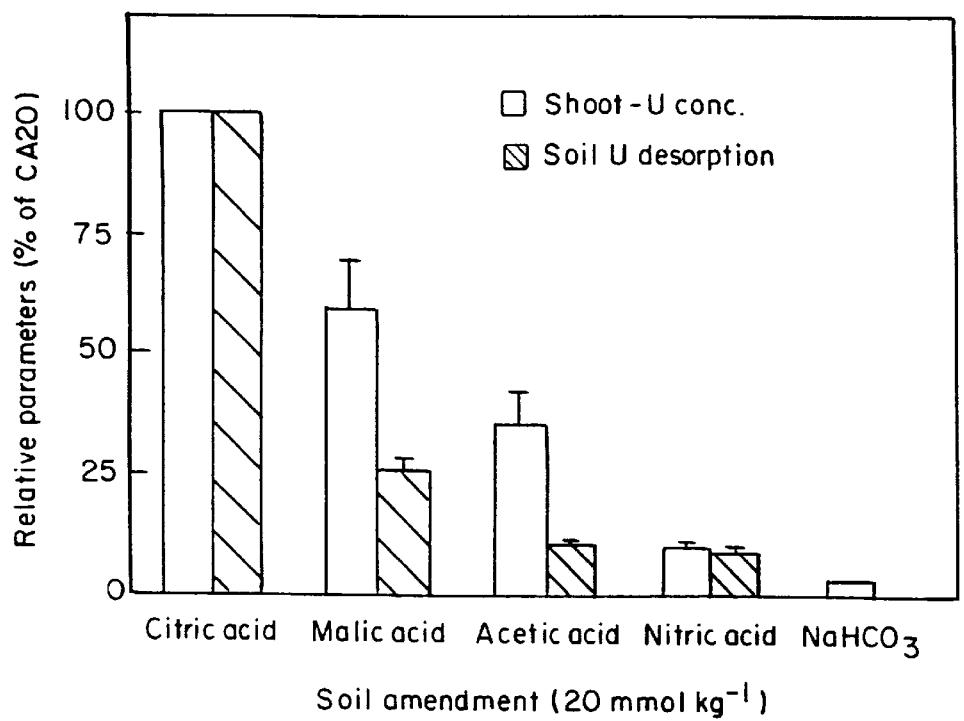
Figure 9:
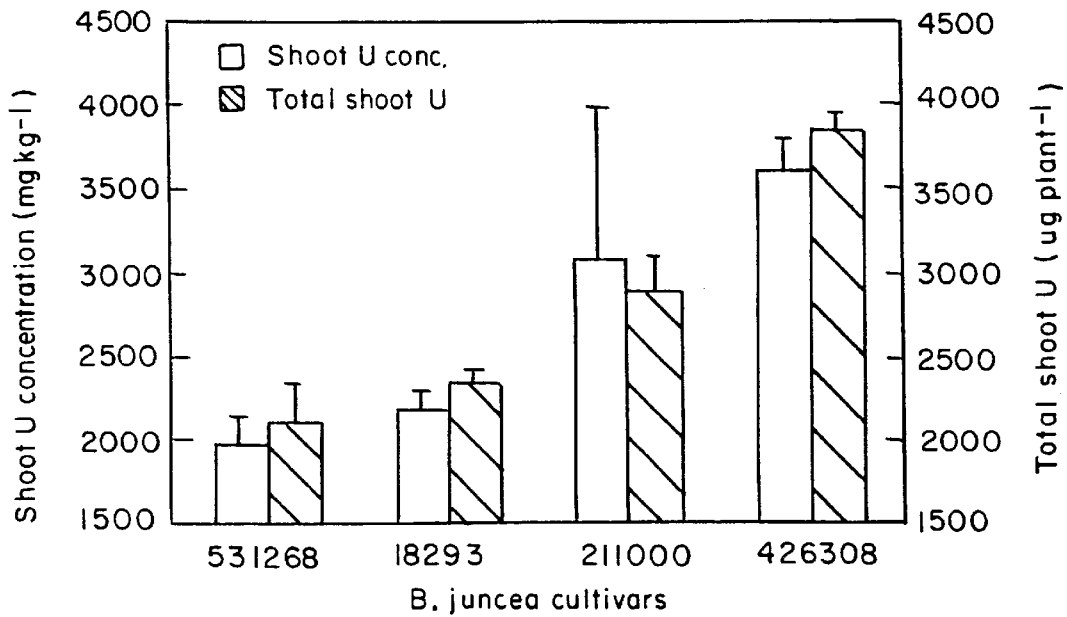
Figure 10:
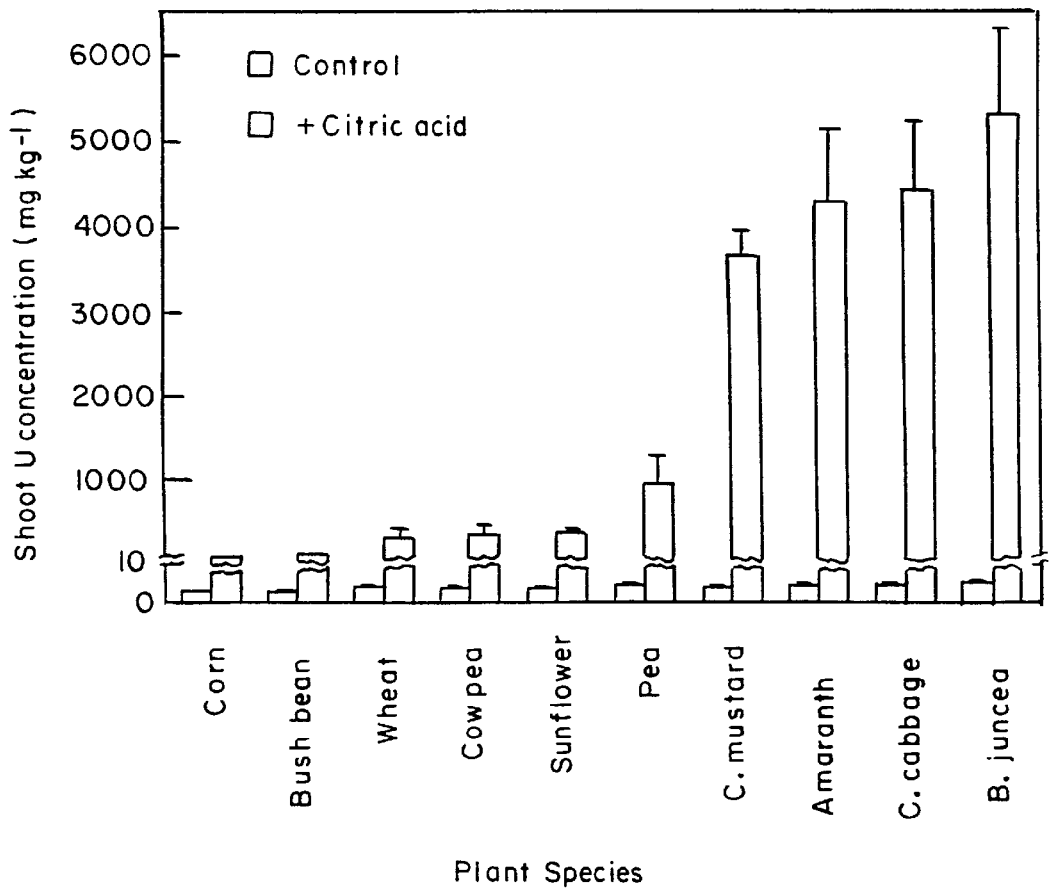
Figure 11:
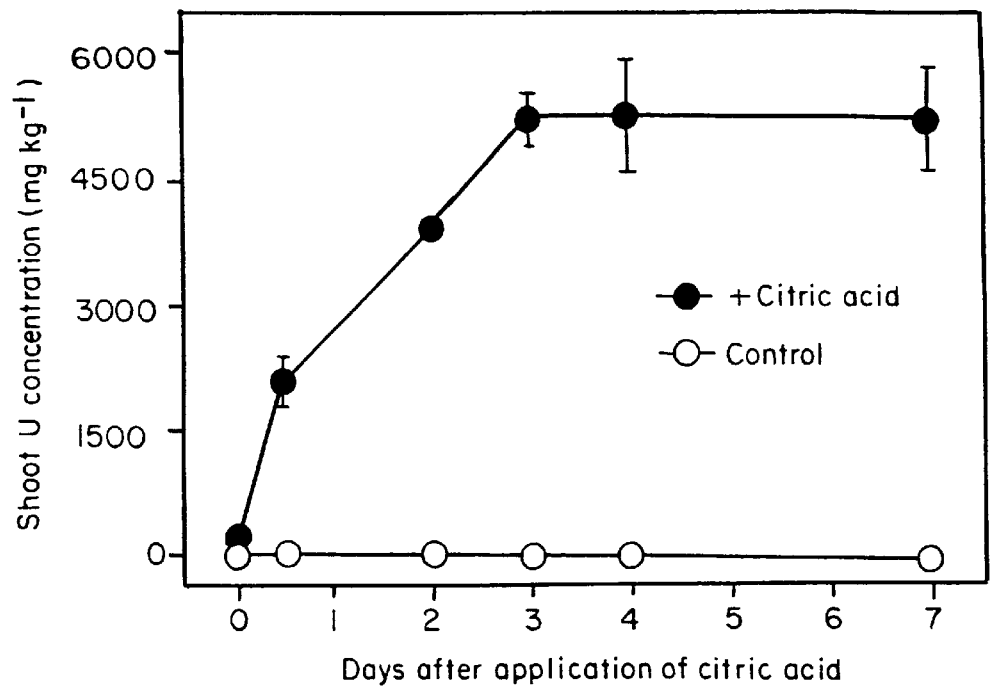
Figure 12:
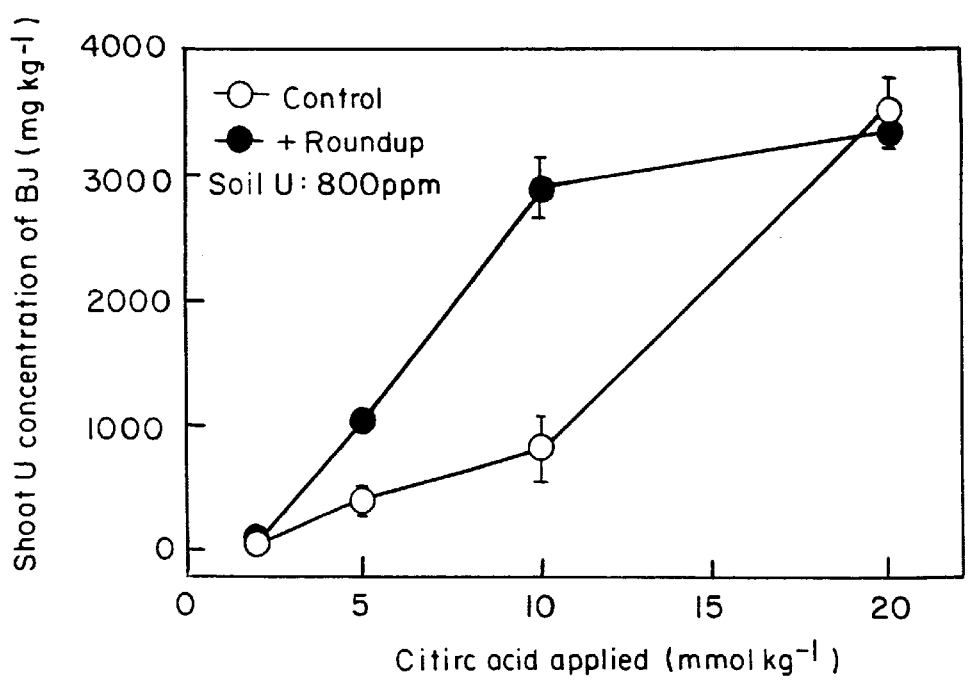

Results and Discussion:

Results are presented in FIG. 6. As can be seen, the concentration of lead accumulated in *B. juncea* roots increased with increasing solution concentration, though some decline in rate was observed when lead was present in the solution at concentrations above about 50 mg/L. By contrast, the concentration of lead accumulated in *B. juncea* shoots did not increase significantly until the concentration of lead in the solution approached 100 mg/L. At the highest concentration of lead tested (188 mg/L), lead levels in shoots reached about 1.6%.

The results presented in FIG. 6 confirm the findings reported in Example 8, that lead hyperaccumulation in plant shoots is only induced by exposure to heavy metal when the metal is present at a concentration above some threshold value.

Example 10

Manipulations of the Environment that Increase Metal Availability

A variety of different techniques can be used to increase metal availability in soils in accordance with the present invention. These treatments can be applied individually or separately.

Chelators

As discussed above, many metal chelators act to increase metal mobility in soils (in addition to and distinct from any effect such chelators may have on inducing metal transport into plant roots). For purposes of this section, an "effective amount" of a metal chelator is an amount sufficient to increase metal mobility but not sufficient to significantly alter plant growth and development. Desirable "effective amounts" of particular chelators are readily determined through measurements metal mobility effects.

For example, the concentration of soluble metals in soils can be measured according to the technique described by Mench et al. (J. Environ. Qual. 23:58, 1994, incorporated herein by reference). Briefly, metals are extracted from 5 g of soil by equilibration with about 25 ml of 0.01 M calcium nitrate (to maintain ionic strength) for about 2 hours on a mechanical shaker. After the equilibration period, the suspension is centrifuged (between 3000–5000×g) for about 15 minutes to separate the solution from the soil. The supernatant solution is then analyzed for the desired water-soluble metal concentration. Measured metal concentration is correlated with the amount and type of chelator added, so that optimal conditions for maximizing metal availability are determined.

Many metal chelators increase metal availability by forming soluble complexes with metals, thereby increasing metal solubility in the soil solutions. Exemplary solubilizing chelators include ammonium purpurate (murexide), 2,3-butane-dione dioxime (dimethylglyoxime), 3,6 disulfo-1,8-dihydroxynaphthalene (chromotroic acid), thiourea, alpha-benzoin oxime (cupron), trans-1,2-diaminocyclohexanetetraacetic acid (CDTA), diethylene-triaminopentaacetic acid (DTPA), 2,3-dimercapto-1-propanol, diphenylthiocarbazone, nitrilotriacetic acid (NTA), substituted 1,10-phenanthrolines (e.g., 5-nitro-1,10 phenanthroline), sodium diethyldithiocarbamate (cupral), 2-phenoyl-2-furoylmethane, phenoyl-trifluoroacetone, triethylenetetramine, EDTA, citric acid, EGTA, HEDTA, salicylic acid, and malic acid. (see Dawson et al., (eds), "Stability Constants of Metal Complexes", pp. 399–415, Data for Biochemical Research, Claredon Press, Oxford, UK, 1986, incorporated herein by reference).

Chelating agents are preferably applied to soil by conventional irrigation pipes or other ground level irrigation systems. Chelating agents may alternately be applied through commercially available fertilizer and chemical application equipment, including large volume sprayers. Chelating agents may be applied through broadcast methods for large areas or banding methods for the root zone. Chelating agents are preferably applied at concentrations from 0.1–10 mmol/kg soil.

Acidification

Also as discussed above, metal mobility in soil can be increased by decreasing the soil pH. Conventional methods of plant cultivation generally require soil in the pH range 5.8–6.2 for optimum production and the available literature suggests that soils with lower pH be specifically amended with base (e.g., lime) prior to seeding to increase the pH (see, for example, "Agronomy of Canola in the United States", pp. 25–35 in Canola and Rapeseed, Production, Chemistry, Nutrition, and Processing Technology, ed. F. Shahidi, Van Nostrand Reinhold, New York, 1990, incorporated herein by reference).

In order to increase metal availability in the practice of the present invention, however, pH of the metal-contaminated soil is reduced to about pH 4.5–5.5 by acidifying the soil with an effective amount of organic or inorganic acids (such as nitric acid, hydrochloric acid, sulfuric acid, acetic acid and citric acid). Acids are preferably applied to the soil by conventional irrigation pipes or other ground level irrigation systems. Acids may alternately be applied through other commercially available fertilizer and chemical application equipment, including large volume sprayers. Acids are preferably applied at concentrations from 0.1 mM to 1.0 M at volumes ranging from about 5 to 200 tons per acre or at levels sufficient to drop soil pH in the plant rhizosphere (down to about 40 cm) to between 4.5 and 5.5 pH units.

Acidification of the plant environment may alternately be accomplished by addition to the environment of compounds that depress soil pH because of biological activity of roots and microorganisms. Examples of these compounds include urea or ammonium sulfate. This so-called "biological acidification" occurs because the positively charged ammonium ions that are incorporated into the roots and/or microorganisms are replaced with positively charged protons exuded or otherwise released from the rhizosphere into the soil, thus lowering the soil pH. The ammonium-containing compounds are applied at 0.5 to about 2.0 tons per acre.

Where acidification techniques are employed in combination with chelators, it is generally desirable to reduce the soil pH by at least 2 units over a period of several days, preferably to a pH within the range of about 3–4.5, by adding strong chelators or acids prior to harvest but after the plants have reached the harvestable stage.

Electric Field

Metal availability can be enhanced by using electrical fields to increase metal mobility (see, for example, Probstein et al., Science 260:498, 1993, incorporated herein by reference). In this method, a direct current electric field is applied across electrode pairs placed in the ground. The electric field induces motion of liquids and dissolved ions.

Soil Tilling

Metal availability to plant roots can be increased by tilling soil to depths greater than 2 cm and as far down as 50 cm. Conventional implements may be employed for this purpose, provided that they are suitable for tilling down to the depths required by the present methods. These implements include moldboard plows, chisel plows, tandem and offset disc plows, and various harrowers known to those having ordinary skill in the art. The exact implement used will depend on factors understood in the art, such as soil moisture, soil texture, weed cover and the like.

OTHER EMBODIMENTS

The foregoing has set forth certain preferred embodiments of the present invention. The foregoing description is not meant to limit the scope of the present invention. One of ordinary skill in the art will readily appreciate that various modifications and alterations are within the scope of the following claims.

What is claimed is:

1. A method of inducing hyperaccumulation of a metal into shoots of a plant comprising;
    planting a plant in a soil environment contaminated with one or more metals;
    manipulating the soil environment to increase chemical availability of metals in the environment to the plant;
    cultivating the plant in the manipulated soil environment under conditions and for a time sufficient for the plant to accumulate metal in its roots; and
    exposing the plant to an inducing agent under conditions and for a time sufficient for the inducing agent to induce the plant to hyperaccumulate metal in its shoots.

2. The method of claim 1 further comprising a step of harvesting the plant shoots into which metal has been accumulated.

3. The method of claim 1 or 2 wherein the step of exposing comprises exposing the plant to an inducing agent under conditions and for a time sufficient that the plant accumulates more metal in its shoots than it would accumulate in the absence of the inducing agent.

4. The method of claim 3 wherein the step of exposing comprises exposing the plant to an inducing agent under conditions and for a time sufficient that the plant accumulates at least about twice as much metal in its shoots as it would accumulate in the absence of the inducing agent.

5. The method of claim 3 wherein the step of planting comprises planting a plant in a soil environment contaminated with one or more metals selected from the group consisting of aluminum, antimony, arsenic, barium, beryllium, cadmium, chromium, cobalt, copper, gold, lead, manganese, mercury, molybdenum, nickel, palladium, selenium, silver, strontium, tin, uranium, vanadium, zinc, zirconium and combinations thereof with one another or with an organic contaminant.

6. The method of claim 5 wherein the step of planting comprises planting a plant in a soil environment contaminated with a metal that is not essential for plant growth.

7. The method of claim 5, wherein the step of planting comprises planting a plant in a soil environment contaminated with a metal selected from the group consisting of cadmium, chromium, copper, lead, nickel, and zinc.

8. The method of claim 5, wherein the step of planting comprises planting a plant in a soil environment contaminated with cadmium and the step of exposing comprises exposing the plant to an inducing agent under conditions and for a time sufficient that the plant accumulates at least about 500 $\mu$g cadmium/g dry weight plant tissue.

9. The method of claim 8, wherein the step of exposing comprises exposing the plant to an inducing agent under conditions and for a time sufficient that the plant accumulates at least about 1000 $\mu$g cadmium/g dry weight plant tissue.

10. The method of claim 5, wherein the step of planting comprises planting a plant in a soil environment contaminated with copper and the step of exposing comprises exposing the plant to an inducing agent under conditions and for a time sufficient that the plant accumulates at least about 1000 $\mu$g copper/g dry weight plant tissue.

11. The method of claim 10, wherein the step of exposing comprises exposing the plant to an inducing agent under conditions and for a time sufficient that the plant accumulates at least about 2500 $\mu$g copper/g dry weight plant tissue.

12. The method of claim 5, wherein the step of planting comprises planting a plant in a soil environment contaminated with lead and the step of exposing comprises exposing the plant to an inducing agent under conditions and for a time sufficient that the plant accumulates at least about 3000 $\mu$g lead/g dry weight plant tissue.

13. The method of claim 12, wherein the step of exposing comprises exposing the plant to an inducing agent under conditions and for a time sufficient that the plant accumulates at least about 4000 $\mu$g lead/g dry weight plant tissue.

14. The method of claim 12, wherein the step of exposing comprises exposing the plant to an inducing agent under conditions and for a time sufficient that the plant accumulates at least about 6000 $\mu$g/g lead/g dry weight plant tissue.

15. The method of claim 5, wherein the step of planting comprises planting a plant in a soil environment contaminated with nickel and the step of exposing comprises exposing the plant to an inducing agent under conditions and for a time sufficient that the plant accumulates at least about 200 $\mu$g nickel/g dry weight plant tissue.

16. The method of claim 15, wherein the step of exposing comprises exposing the plant to an inducing agent under conditions and for a time sufficient that the plant accumulates at least about 500 $\mu$g nickel/g dry weight plant tissue.

17. The method of claim 5, wherein the step of planting comprises planting a plant in a soil environment contaminated with zinc and the step of exposing comprises exposing the plant to an inducing agent under conditions and for a time sufficient that the plant accumulates at least about 1000 $\mu$g zinc/g dry weight plant tissue.

18. The method of claim 17, wherein the step of exposing comprises exposing the plant to an inducing agent under conditions and for a time sufficient that the plant accumulates at least about 2000 $\mu$g zinc/g dry weight plant tissue.

19. The method of claim 1 wherein the step of manipulating comprises reducing the soil pH to about pH 3.0–5.5.

20. The method of claim 19 wherein the step of manipulating comprises reducing soil pH through application of an effective amount of an organic or inorganic acid selected from the group consisting of niric acid, hydrochloric acid, sulfuric acid, acetic acid, and citric acid.

21. The method of claim 19 wherein the step of manipulating comprises reducing soil pH through application of a compound that is metabolized by the plant rhizosphere in a manner that produces protons.

22. The method of claim 3 wherein the step of planting comprises planting a plant that is a member of the family Brassicaceae.

23. The method of claim 22 wherein the step of planting comprises planting a plant that is a member of a genus selected from the group consisting of Brassica, Thlaspi, Alyssum, and Eruca.

24. The method of claim 23 wherein the step of planting comprises planting a plant that is a member of a species selected from the group consisting of *Brassica juncea, Brassica nigra, Brassica campestris, Brassica carinata, Brassica napus,* and *Brassica oleracea.*

25. The method of claim 23 wherein the step of planting comprises planting a plant that is a *Brassica juncea* cultivar.

26. The method of claim 25 wherein the step of planting comprises planting *Brassica juncea* cultivar number 426308.

27. The method of claim 3 wherein the step of exposing comprises exposing the plant to an inducing agent that stimulates metal transport from plant roots to plant shoots.

28. The method of claim 27 wherein the step of exposing comprises exposing the plant to an inducing agent that does not substantially affect metal uptake into plant roots.

29. The method of claim 3 wherein the step of exposing comprises exposing the plant to an inducing agent selected from the group consisting of chelators, soil acidifiers, herbicides, and detergents.

30. The method of claim 29 wherein the step of exposing comprises exposing the plant to a chelator selected from the group consisting of EDTA, EGTA, DTPA, CDTA, HEDTA, NTA, citric acid, salicylic acid, and malic acid.

31. The method of claim 30 wherein the step of exposing comprises exposing the plant to EDTA.

32. The method of claim 31 wherein the step of exposing comprises exposing the plant to a concentration of EDTA greater than about 0.2 mM.

33. The method of claim 29 wherein the step of exposing comprises exposing the plant to a soil acidifier selected from the group consisting of nitric acid, acetic acid, ammonium acetate, ammonium sulfate, ferrous sulfate, ferrous sulfide, elemental sulfur, sulfuric acid, citric acid, and ascorbic acid.

34. The method of claim 29 wherein the step of exposing comprises exposing the plant to reduced pH conditions by adding to the soil a metabolite that is processed by elements of the plant rhizoshpere in a manner that produces protons.

35. The method of claim 33 wherein the step of exposing comprises exposing the plant to a soil pH below about pH 5.0.

36. The method of claim 35 wherein the step of exposing comprises exposing the plant to a soil pH below about pH 3.5.

37. The method of claim 32 wherein the step of exposing comprises exposing the plant to an herbicide selected from the group consisting of MCPA, maleic hydrazide, 2,4-D, glyphosate, and combinations thereof.

38. The method of claim 29 wherein the step of exposing comprises exposing the plant to a combination of chelating agent and soil acidifier.

39. The method of claim 38 wherein the chelating agent is selected from the group consisting of EDTA, EGTA, DTPA, CDTA, HEDTA, NTA, citric acid, salicylic acid, and malic acid, and the soil acidifier is selected from the group consisting of nitric acid, acetic acid, ammonium acetate, ammonium sulfate, ferrous sulfate, ferrous sulfide, elemental sulfur, sulfuric acid, citric acid, ascorbic acid, and metabolites that are processed by elements of the plant rhizoshpere in a manner that produces protons.

40. The method of claim 29 wherein the step of exposing comprises exposing the plant to a combination of chelating agent and herbicide.

41. The method of claim 40 wherein the chelating agent is selected from the group consisting of EDTA, EGTA, DTPA, CDTA, HEDTA, NTA, citric acid, salicylic acid, and malic acid, and the herbicide is selected from the group consisting of MCPA, maleic hydrazide, 2,4-D, glyphosate, and combinations thereof.

42. The method of claim 41 wherein the step of exposing comprises:

exposing the plant to the chelating agent;

waiting a period of time; and exposing the plant to the herbicide.

43. The method of claim 29 wherein the step of exposing comprises exposing the plant to an acidifying agent and an herbicide.

44. The method of claim 43 wherein the acidifying agent is selected from the group consisting of nitric acid, acetic acid, ammonium acetate, ammonium sulfate, ferrous sulfate, ferrous sulfide, elemental sulfur, sulfuric acid, citric acid, ascorbic acid, and metabolites that are processed by elements of the plant rhizosphere in a manner that produces protons and the herbicide is selected from the group consisting of glycophosphate, MCPA, maleic hydrazide, 2,4-D, glyphosate, and combinations thereof.

45. The method of claim 44 wherein the step of exposing comprises:

exposing the plant to the acidifying agent;

waiting a period of time; and exposing the plant to the herbicide.

46. The method of claim 1 wherein the step of manipulating comprises applying an effective amount of a chelating agent.

47. The method of claim 46 wherein the chelating agent is selected from the group consisting of murexide, dimethylglyoxime, chromotroic acid, thiourea, cupron, CDTA, DTPA, NTA, substituted 1,10-phenanthrolines, cupral, 2-phenoyl-2-furoylmethane, phenoyltrifluoroacetone, triethylamine, EDTA, citric acid, EGTA, HEDTA, salicylic acid, and malic acid.

48. The method of claim 1 wherein the step of manipulating comprises applying an electric field to increase metal mobility.

49. A method of removing metal from an environment contaminated with the metal, the method comprising:

planting a plant that is a member of the family Brassicaceae in the environment;

applying an agent selected from the group consisting of chelating agents, acidifiers, and combinations thereof to the environment to increase metal availability to the plant planted therein;

waiting for a period; and applying an herbicide to the environment to induce hyperaccumulation of metal in shoots of the plant.

50. The method of claim 49 wherein the plant is a member of the genus selected from the group consisting of Brassica, Thlaspi, Alyssum, and Eruca.

51. The method of claim 50 wherein the plant is a member of a species selected from the group consisting of *Brassica juncea, Brassica nigra, Brassica campestris, Brassica carinatam Brassica napus,* and *Brassica oleracea.*

52. The method of claim 51 wherein the plant is a *Brassica juncea* cultivar.

53. In a method of removing metal from an environment by cultivating a plant therein, the improvement that comprises:

exposing the plant to an inducing agent under conditions and for a time sufficient to induce the plant to hyperaccumulate metal in its shoots to a level higher than the plant would accumulate in the absence of the inducing agent.

54. The method of claim 55 wherein the inducing agent is selected from the group consisting of chelating agents, soil acidifiers, and herbicides.

55. The method of claim 53 wherein the plant is a *Brassica juncea* cultivar, the metal is lead, and the inducing agent is selected from the group consisting of at least 0.2 mM EDTA, pH less than about 3.5, and an herbicide selected from the group consisting of glyphosate, 2,4-D, and combinations thereof.

56. The method of claim 53 wherein the metal is selected from the group consisting of cadmium, copper, nickel, lead, and zinc.

57. The method of claim 56 wherein the inducing agent is selected from the group consisting of a chelator, an herbicide, and combinations thereof.

* * * * *